US008316750B2

(12) United States Patent
Toeckes et al.

(10) Patent No.: US 8,316,750 B2
(45) Date of Patent: Nov. 27, 2012

(54) APPARATUS AND METHOD FOR LAUNCHING INCENDIARY PROJECTILES

(75) Inventors: Mark Toeckes, Delta (CA); Earl Trautman, Delta (CA); Cyril T. Boys, Atlanta, GA (US)

(73) Assignee: Donmark Holdings Inc., Delta (CA)

( * ) Notice: Subject to any disclaimer, the term of this patent is extended or adjusted under 35 U.S.C. 154(b) by 407 days.

(21) Appl. No.: 12/463,478

(22) Filed: May 11, 2009

(65) Prior Publication Data

US 2010/0282230 A1 Nov. 11, 2010

(51) Int. Cl.
*F41F 5/00* (2006.01)
*B64D 1/00* (2006.01)
*F41B 11/00* (2006.01)

(52) U.S. Cl. .......................................... 89/1.51; 124/71

(58) Field of Classification Search .............. 124/71-77; 89/1.51

See application file for complete search history.

(56) References Cited

U.S. PATENT DOCUMENTS 2,698,664 A * 1/1955 Freeman .......................... 169/25
3,448,654 A * 6/1969 Crabtree et al. ............... 89/1.51
4,696,347 A * 9/1987 Stolov et al. ..................... 169/46
4,993,400 A * 2/1991 Fitzwater ........................ 124/48
5,267,501 A * 12/1993 Shillig ........................... 89/1.51
5,727,538 A * 3/1998 Ellis ................................ 124/77
5,816,232 A * 10/1998 Bell ............................. 124/51.1
6,347,621 B1 * 2/2002 Guthrie ........................... 124/48
6,502,567 B1 * 1/2003 Christopher et al. ........ 124/51.1
6,877,433 B1 * 4/2005 Stevenson ..................... 102/364
7,275,529 B2 10/2007 Boys
7,451,679 B2 * 11/2008 Stevenson et al. ............. 89/1.51
2004/0074487 A1 * 4/2004 Christopher et al. ........... 124/56
2006/0027380 A1 * 2/2006 Stevenson et al. .............. 169/45
2006/0169263 A1 8/2006 Boys
2006/0178085 A1 * 8/2006 Sotereanos et al. ........... 446/456
2007/0039602 A1 * 2/2007 Caspi .............................. 124/74
2010/0101401 A1 * 4/2010 Toeckes et al. ................ 89/1.51

FOREIGN PATENT DOCUMENTS

WO WO/2004/041365 5/2004
WO WO/2008/104061 9/2008

* cited by examiner

*Primary Examiner* — Bret Hayes

(57) ABSTRACT

An apparatus and method for launching incendiary projectiles is provided. The apparatus includes a support adapted to being mounted to a vehicle, a pneumatic launcher connected to the support and operable to launch a projectile that has been delivered to the launcher, a gas delivery system operable to deliver a volume of pressurized gas to the launcher for launching the projectile, a projectile delivery system operable to deliver projectiles to the launcher, an injector cooperating operable to receive projectiles from the projectile delivery system and to inject the projectiles with an amount of reactant suitable to produce a delayed exothermic reaction with the incendiary material to prime the projectile, and thereafter convey the primed projectile to the launcher; and a controller operable to operable to regulate the launching of the projectiles.

17 Claims, 11 Drawing Sheets

APPARATUS AND METHOD FOR LAUNCHING INCENDIARY PROJECTILES

BACKGROUND OF THE INVENTION

1. Field of Invention

This invention relates to intentional burning for land and forestry management and, in particular, to an apparatus, method and system for launching incendiary projectiles.

2. Description of Related Art

Prescribed burning is the intentional burning of typically forested areas to meet specific land management objectives, such as to reduce flammable fuels, restore ecosystem health, recycle nutrients, or prepare an area for new trees or vegetation.

Devices for igniting prescribed fires include conventional land based and aerial ignition devices. Aerial ignition devices are typically mounted on a helicopter, receive plastic spheres containing an incendiary material, such as potassium permanganate, inject the received spheres with a reactant, such as ethylene glycol, and then expel the injected spheres to fall from the helicopter. A delayed exothermic reaction between the incendiary material and the reactant within the spheres can produce a prescribed fire where the spheres land. The delay of the exothermic reaction is typically 25 to 30 seconds. Significant disadvantages to aerial ignition operations are the cost of operating the aircraft, the need for at least two persons to conduct the burning operations, namely a pilot and an operator for the ignition device, the inherent time delay in getting aerial operations underway as opposed to ground based operations, and the safety risk in having incendiary material being handled in an aircraft.

Conventional land based ignition devices include a conventional hand-held drip torches that drip ignited fuel on the ground as the operator walks along a desired path for the prescribed burn. A disadvantage to these torches is that they require the operator to be at the point of origin of the fire and this poses a significant safety concern. Another disadvantage to hand held drip torches is that the process of igniting a prescribed burn with them is both personnel intensive and time intensive.

Other land based ignition devices include flame throwers. A disadvantage to using flame throwers is that they use a gelled fuel which must be premixed and transported to the site of the prescribed burn. This introduces safety issues and the transport of the gelled fuel is highly regulated. As well, once the fuel is mixed, it must all be used up or otherwise safely disposed, and this means a lack of flexibility as well as economic considerations since the fuel itself is quite costly. In addition, the range of flame thrower, while greater than a hand torch, is still not as far as one would like from a safety perspective. Logistics are also a problem with the use of flame throwers as the gelled fuel requires large mixing and storage tanks which means that large trucks or trailers must be brought into the zone of the prescribed burn, and this limits the terrain on which flame throwers can be used.

Accordingly, it would be desirable to have land based ignition devices, methods and systems that overcome some or all of the disadvantages of the prior art.

SUMMARY

The above shortcomings may be addressed by providing, in accordance with one aspect of the invention, an apparatus for launching incendiary projectiles from a moving vehicle. The apparatus includes: a vehicle mount for removably mounting the apparatus to the vehicle, a pneumatic launching assembly connected to the vehicle mount and operable to launch the projectiles using a volume of gas, a gas delivery system in fluid communication with the launching assembly for delivering the volume of gas to the launching assembly, a projectile delivery assembly connected to the launching assembly for delivering projectiles to the launching assembly, and a controller for controlling the launching assembly, the gas delivery system and the projectile delivery assembly to control the launching of the projectiles. The apparatus may further include a reactant storage container and an injector mechanism in fluid communication with the reactant storage container and operable for receiving unprimed projectiles from the projectile delivery assembly, injecting the projectiles with an amount of reactant suitable to produce a delayed exothermic reaction with incendiary material in the projectile thereby priming the projectile, and thereafter conveying the primed projectile to the launching assembly. The delivery assembly may deliver projectiles to the launcher at a launching rate and the injector may inject the projectiles at the launching rate.

The injector mechanism may comprise a pump for pumping an amount of reactant and a piercing mechanism in fluid communication with the pump for piercing a projectile and delivering the reactant to the interior of the projectile.

The piercing mechanism may be a reciprocating piercing mechanism operable to pierce the projectile as the reciprocating piercing mechanism approaches one end of its range of motion and to disengage from the projectile as the reciprocating piercing mechanism approaches the other end of its range of motion to enable the primed projectile to be conveyed to the launching means. The pump may be a constant displacement pump that delivers a fixed amount of reactant. The reciprocating piercing mechanism may be operable to actuate the pump to pump said volume of reactant as the reciprocating piercing mechanism pierces the projectile and to disengage from the pump as the reciprocating piercing mechanism disengages from the projectile, thereby synchronizing the pumping of said volume of reactant with the piercing of the projectile.

The projectile delivery assembly may comprise a container for storing a plurality of projectiles and a separator assembly operable to isolate one projectile from the plurality of projectiles and deliver said projectile to the launching assembly. The separator assembly may comprise an outlet passage that is operable to receive projectiles and arrange the projectiles in a projectile queue and that communicates with the container and the launching assembly, and a rotating assembly mounted for rotation within the container and having a rotor with a rigid vane extending from a periphery of the rotor, wherein the rigid vane may be adapted to moving one projectile from the container and delivering said projectile to the outlet passage.

The rotor may further include a plurality of flexible vanes extending from the periphery and each of the flexible vanes may be adapted to briefly contact and then brush past a last projectile in the projectile queue as the rotor rotates to impart a periodic motive force on said last projectile that is transmitted to the other projectiles in the projectile queue tending to move the projectiles towards the launching assembly, thereby providing a feed pressure on the queue of projectiles.

The rotating assembly may further include a selector plate above the rotor that separates the plurality of projectiles from the rotor and defines an annular space with the rotor in which the vanes travel as the rotating assembly rotates, the selector plate further defines an opening operable to transmit one projectile at a time through the selector plate to the annular space to be engaged by the rigid vane and delivered to the outlet passage. The outlet passage may communicate tangentially with the annular space. The outlet passage may include a finger that extends into the annular space and is adapted to directing the projectile from the annular space into the outlet passage. The projectile delivery assembly may further comprise a deflector that directs projectiles in the container toward the opening in the selector plate.

The launching assembly may comprise a tubular barrel defining a breach and wherein the barrel is adapted to receiving the primed projectile and the volume of gas upstream of the primed projectile via the breach. The launching assembly may further comprise a frame and wherein the barrel is mounted for reciprocating movement within the frame in a manner that at one end of the barrel's range of motion the breach is sealed to the gas delivery means and at the other end of the barrel's range of motion the breach is exposed to permit a projectile to enter the barrel. The launching assembly may further comprise an actuator that cooperates with the barrel to cause the barrel to reciprocate. The actuator may also cooperates with the reciprocating piercing mechanism to cause the reciprocating piercing mechanism to reciprocate to synchronize the movement of the barrel and the reciprocating piercing mechanism.

The actuator may be adapted to produce a launching sequence wherein the launching sequence comprises: causing the reciprocating piercing means to inject a projectile with reactant; causing the reciprocating piercing means to withdraw from the projectile; causing the barrel to move so as to clear the breach to enable the loading of a projectile into the barrel; causing the barrel to move to close the breach and seal with the gas delivery system. The apparatus may further include a sensing means that determines the end of a launch sequence and signals the controller means to cause the gas delivery means to deliver a volume of gas to the barrel.

In accordance with another aspect of the invention, there is provided an apparatus for storing a plurality of spheres of a uniform size and delivering the spheres one at a time to a desired location. The apparatus comprises: a container for holding the spheres; an outlet passage in communication with the container and the desired location, and operable to receive the spheres and arrange them into a queue of spheres; a rotating assembly mounted for rotation within the container and having a rotor with a rigid vane extending from a periphery of the rotor wherein the rigid vane is adapted to moving one sphere from the container and delivering said sphere to the outlet passage; and a plurality of flexible vanes extending from around the periphery of the rotor each of which is adapted to briefly contact and then brush past a last sphere in queue as the rotor rotates to impart a periodic motive force on the last sphere that is transmitted to the other spheres in the queue tending to move the spheres towards the desired location, thereby provide a feed pressure on the queue.

The rotating assembly may further include a selector plate above the rotor that separates the plurality of spheres from the rotor and defines an annular space with the rotor in which the vanes travel as the rotating assembly rotates, the selector plate further defines an opening operable to transmit one sphere at a time through the selector plate to the annular space where the sphere is engaged by the rigid vane and delivered to the outlet passage. The outlet passage may communicate tangentially with the annular space. The outlet passage may include a finger extending tangentially into the annular space and is adapted to directing the sphere from the annular space into the outlet passage. The apparatus may include a deflector that directs spheres in the container toward the opening in the selector plate.

In accordance with another aspect of the invention, there is provided a method of launching incendiary projectiles from a moving vehicle. The method involves: providing unprimed projectiles comprising of an outer casing that encloses an amount of incendiary material; providing a launcher mounted on the moving vehicle and adapted to receiving the projectiles; injecting each projectile at a launching rate with an amount of reactant suitable to produce a delayed exothermic reaction with the incendiary material thereby priming the projectile; loading the primed projectile into the launcher at said launching rate; and providing a volume of gas under pressure to the launcher sufficient to launch the primed projectile away from the launcher.

The method may include the step of controlling said launching rate to a desired launching rate. The controlling of said launching rate may comprise receiving as input a user generated signal, supplying electrical power to a motor in response to said user generated signal, and stopping the supply of electrical power to the motor once the projectile has been launched.

The controlling of said launching rate may comprise: receiving as input an indication of a desired launching rate from a launch rate selector; receiving as input a first user generated signal; supplying electrical power to a drive motor in response to said first user generated signal until such time as the projectile is launched and then stopping the supply of electrical power to the drive motor for a delay duration; detecting a second user generated signal; and repeating step (c) until such time as said second user generated signal is detected, wherein the delay duration is sufficient to produce the desired launching rate.

The method may further comprise detecting an emergency fire condition in the launcher, which may comprise receiving as input a second user generated signal. The method may further comprise correcting said emergency fire condition after said emergency condition is detected, which step may comprise supplying a continuous flow of an inert gas to the launcher until the emergency fire condition is no longer detected. The gas may be carbon dioxide, and the supplying a continuous flow of gas may comprise activating a valve controlling the flow of gas to the launcher.

The providing unprimed projectiles may comprise separating a projectile from a plurality of projectiles within a container and arranging said projectile in a projectile queue. The method may further comprise the step of preloading a plurality of projectiles in a queue of projectiles prior to commencing the step of injecting each projectile. The providing unprimed projectiles may further comprise providing a feed pressure on the queue of projectiles tending to move the projectiles toward the launcher. The providing the feed pressure may comprise imparting a periodic motive force on a last projectile in the projectile queue such that the motive force is transmitted to the other projectiles in the projectile queue. The imparting a periodic motive force may comprise providing a spinning rotor proximate to the last projectile wherein the rotor includes a plurality of flexible vanes extending from a periphery of the rotor in a manner that each flexible vane briefly contacts and then brushes past the last projectile in the projectile queue as the rotor spins.

The injecting the projectiles may comprise injecting the projectiles with an amount of the reactant that is substantially independent of said launching rate. The injecting the projectiles may comprise injecting the amount of the reactant from a constant displacement type pump.

In accordance with another aspect of the invention, there is provided a method of starting a prescribed fire comprising: determining a desired ignition line along which the prescribed fire is to be ignited; providing a vehicle; providing an apparatus for launching incendiary projectiles; operating the vehicle along a path that is generally parallel to the desired ignition line; and periodically launching incendiary projectiles from the apparatus for launching incendiary projectiles towards the desired ignition line. The apparatus for launching incendiary projectiles may be a hand held apparatus or, preferably, it is mounted on the vehicle. The apparatus for launching incendiary projectiles may be mechanical or, preferably, it is pneumatic so as to launch a projectile as a result of a volume of pressurized gas being supplied to it from a gas supply system.

The method may further comprise controlling the launching of incendiary projectiles to a desired launching rate. The controlling said launching rate may comprises receiving as input a user generated signal, supplying electrical power to a drive motor in response to said user generated signal, and stopping the supply of electrical power to the motor once the projectile has been launched. The controlling said launching rate may comprise: a) receiving as input an indication of a desired launching rate from a launch rate selector; b) receiving as input a first user generated signal; c) supplying electrical power to a drive motor in response to said first user generated signal until such time as the projectile is launched and then stopping the supply of electrical power to the drive motor for a delay duration; d) detecting a second user generated signal; and repeating step (c) until such time as said second user generated signal is detected, wherein the delay duration is sufficient to produce the desired launching rate.

In relation to aerial ignition devices, the present invention can be used to replace aerial ignition in some applications where the combination of a mobile vehicle and the ability to project the spheres allows the area to be accessed. In these applications, the apparatus and methods of the present invention has several advantages over aerial ignition because it does not require the use of a helicopter which typically must be booked in advance of the proposed burn, is very expensive to fly, and incurs charges at a reduced stand-by rate even if there is a weather delay. In contrast, the apparatus of the present invention may be set up to operate in minutes and uses relatively inexpensive to operate vehicle platforms. Any operation involving aircraft is inherently more dangerous.

In relation to hand drip torches, the present invention enables faster, less personnel dependent prescribed burn operations because the apparatus can be mounted to a variety of moving vehicles. The present invention is also safer because it can project the ignition points inside of a burn area without requiring a person to enter the area.

In relation to flame throwers, the methods and apparatus of the present invention are more economical since the cost of the projectile spheres is much less than the cost of the fuel for the flame throwers. In addition, the present invention can project the ignition points considerably farther (for example three times as far) into the burn area than the flame throwers. Furthermore, the operation of the apparatus of the present invention can be halted at any time whereas the operations with a flame thrower require that all of the pre-mixed, gelled fuel be used up before the operations can be halted. As well, transportation of the projectile spheres is much safer than transporting a large container of flammable fuel into a fire zone.

Other aspects and features of the present invention will become apparent to those of ordinary skill in the art upon review of the following description of embodiments of the invention in conjunction with the accompanying figures.

BRIEF DESCRIPTION OF THE DRAWINGS

In drawings which illustrate by way of example only embodiments of the invention.

DETAILED DESCRIPTION

Figure 1:
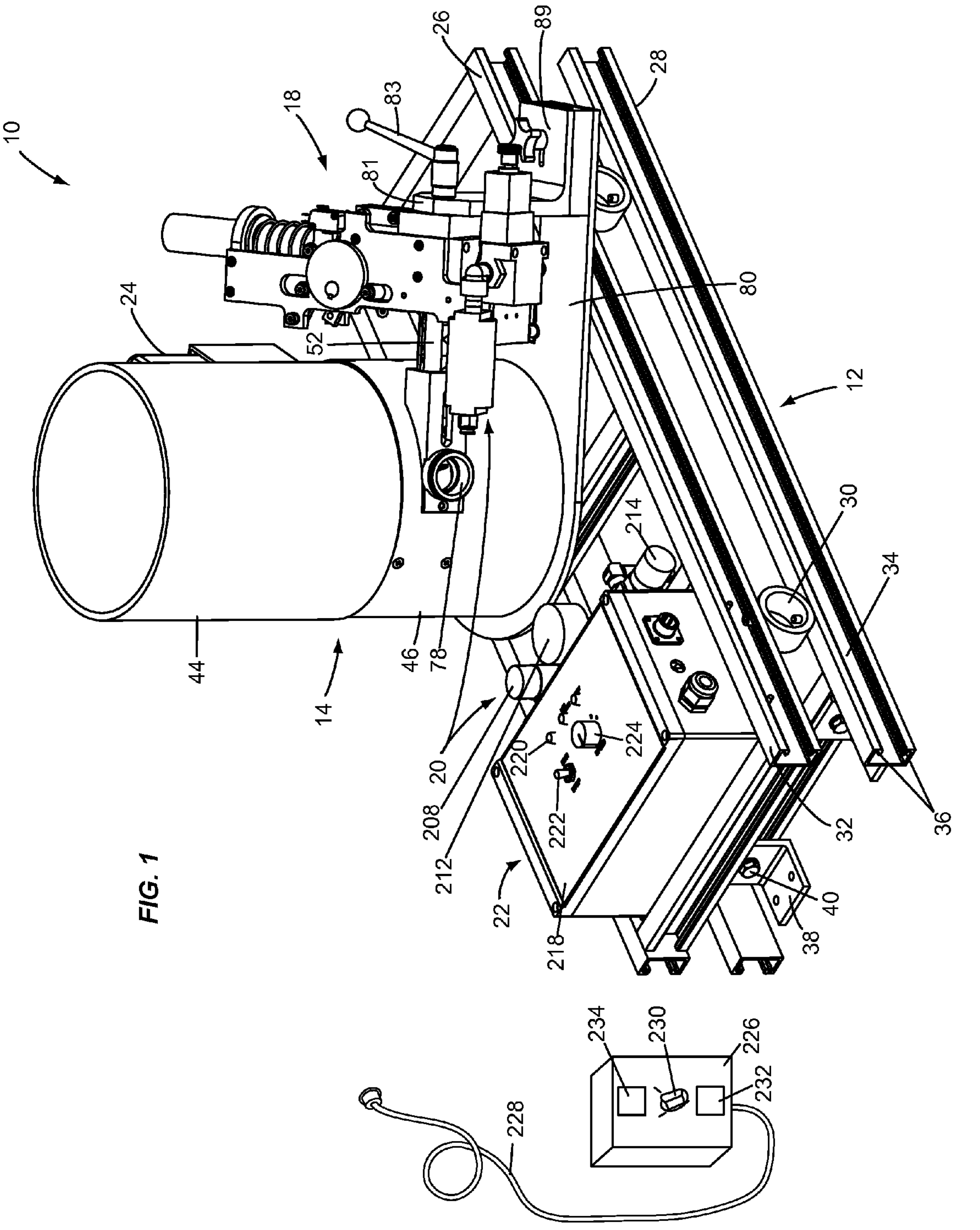
FIG. 1 is a perspective view of an apparatus for launching projectiles according to a first embodiment of the invention.

Referring to FIG. 1, an apparatus for launching incendiary projectiles from a moving vehicle according to an embodiment of the invention is shown generally at 10. Apparatus 10 comprises a vehicle mount 12 onto which is mounted a projectile delivery assembly such as hopper assembly 14, a pneumatic launching assembly such as projectile launcher 18, a propellant gas delivery system such as propellant gas system 20 and a controller 22. A reactant storage container 24 is also provided which holds an amount of liquid reactant that is supplied to the projectile launcher 18. While the reactant storage container 24 is shown attached to the hopper assembly 14, it need not be and may be located at any other convenient position either on the vehicle mount 12 or on the vehicle. A fluid conduit such as a flexible tube (not shown) connects the reactant storage container 24 to the projectile launcher 18.

The vehicle mount 12 is adapted to be mounted onto various land and water based vehicles, such as pickup trucks, all terrain vehicles (ATVs), utility vehicles (UTVs), swamp buggies, boats, airboats, and the like, and also provides a platform onto which the other components of apparatus 10 are mounted. The hopper assembly 14 stores unprimed incendiary projectiles, such as projectile spheres 5, and delivers the unprimed projectile spheres 5 to the projectile launcher 18 in response to signals from controller 22. The projectile launcher 18 injects the unprimed projectile spheres 5 with the reactant to prime them, and then launches the primed projectiles away from the apparatus 10 in response from a signal provided by the controller 22 and using pressurized propellant gas delivered to the projectile launcher 18 by the gas system 20. The gas system 20 regulates and controls the flow of pressurized propellant gas from a storage tank to the projectile launcher 18 in response to a signal from the controller 22 or in response to manual input from an operator of the apparatus 10. And the controller 22 functions to control the operation of the hopper assembly 14, the projectile launcher 18, and the gas system 20. Accordingly, the apparatus 10 is operable to receive unprimed spherical incendiary projectiles 5, inject the projectiles 5 with a reactant to prime them, and then launch the injected (primed) projectiles away from the apparatus 10.

In use, the apparatus 10 is typically mounted on a land or water based vehicle (not shown) such that the primed incendiary projectiles 5 are launched away from the vehicle to cause prescribed burning on the ground where the primed projectiles land. The vehicle is operated along a path that is generally parallel to a desired ignition line for the prescribed fire and the incendiary projectiles are periodically launched towards the desired ignition while the vehicle is in motion.

Figure 3:
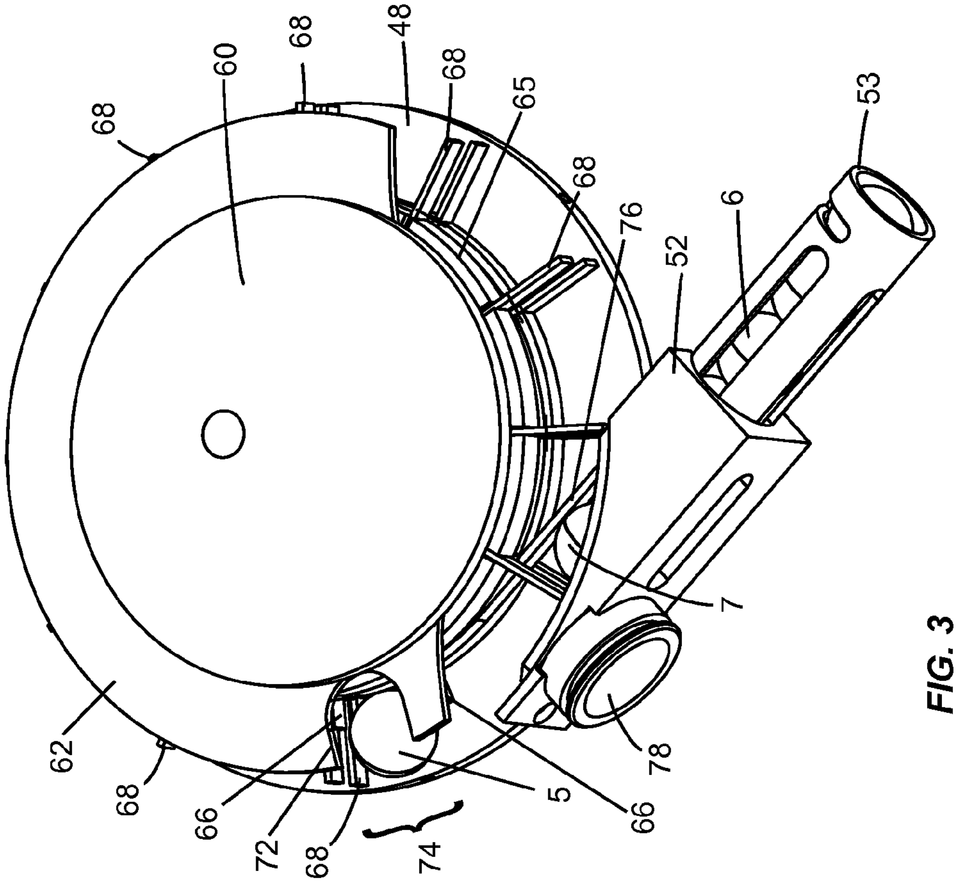
FIG. 3 is a perspective view of a rotating assembly of the hopper assembly shown in FIG. 2.
Figure 2:
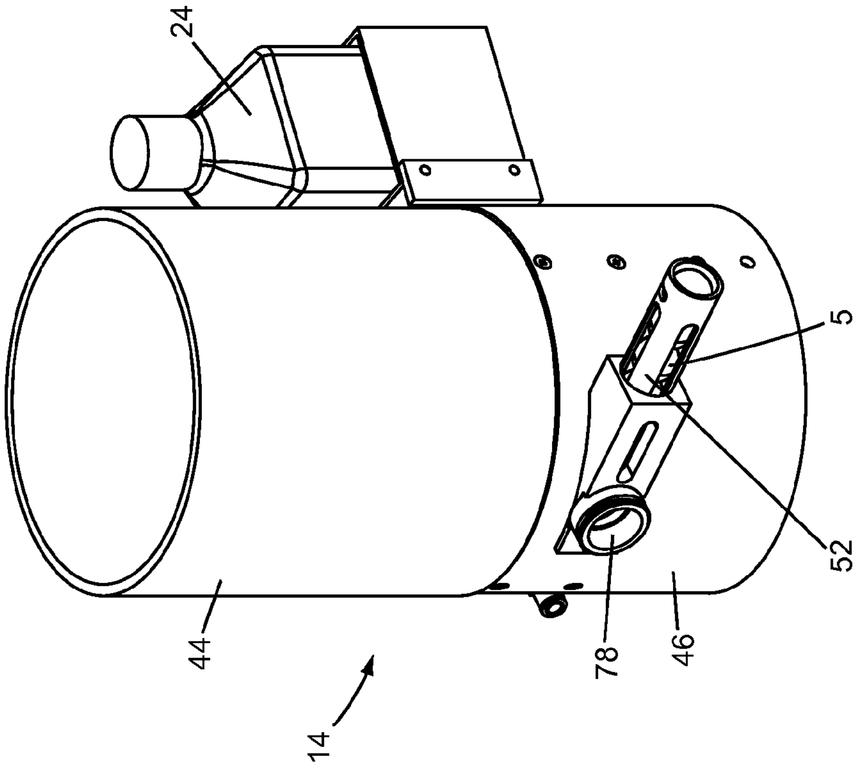
FIG. 2 is a perspective view of a hopper assembly of the apparatus shown in FIG. 1.
Figure 4:
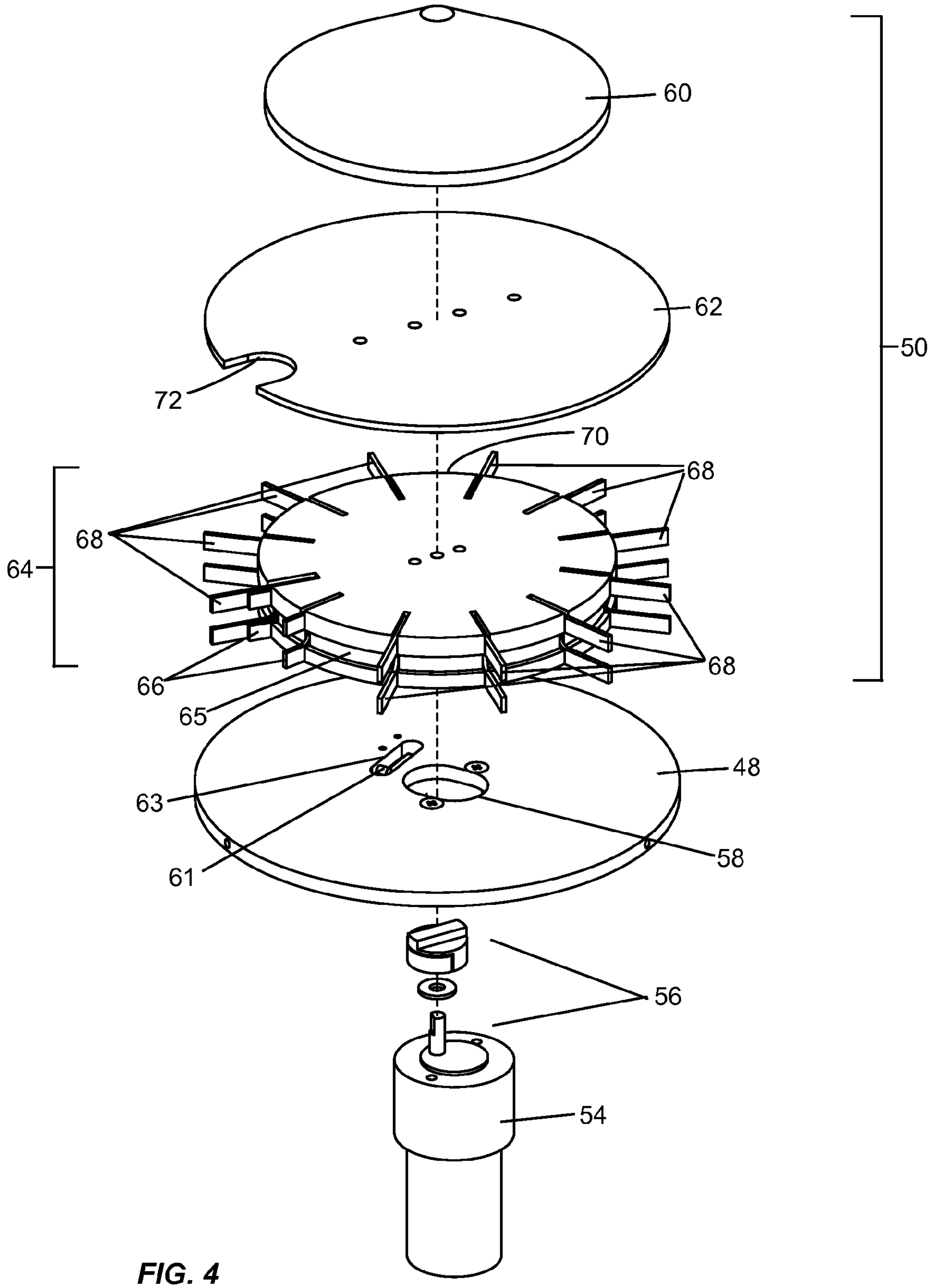
FIG. 4 is an exploded view of the internal components of the hopper assembly shown in FIG. 2.
Figure 5:
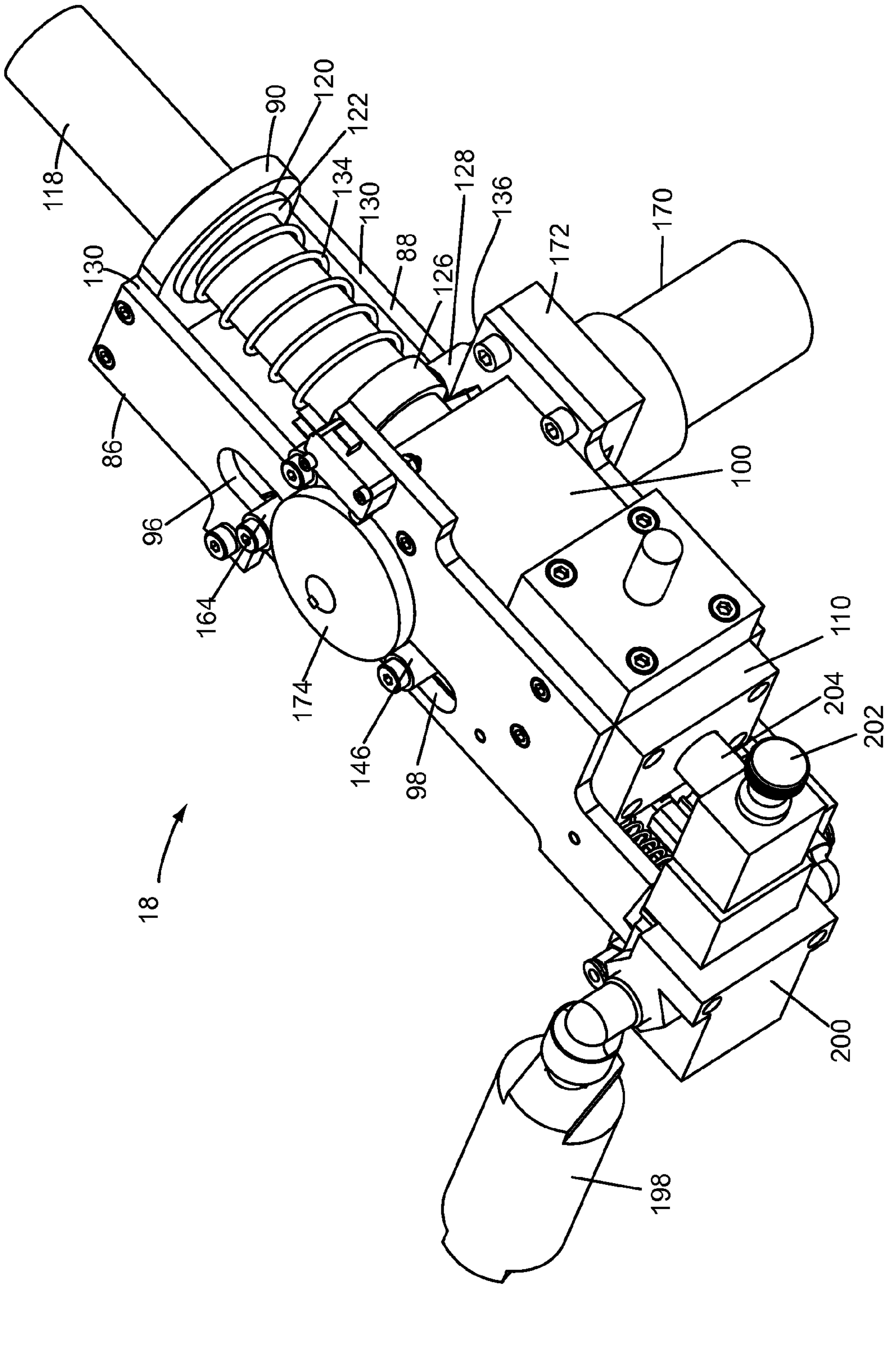
FIG. 5 is a perspective view from the right of a projectile launcher and a portion of a gas system of the apparatus shown in FIG. 1.

The projectiles 5 shown in FIG. 3 are preferably spherical in shape and are all of substantially the same size. Dimensions of the apparatus 10 and its components may be suitably varied to suit projectiles 5 of a particular size. Each projectile sphere may be formed of a plastic spherical exterior and contain therein an incendiary material, such as potassium permanganate or any suitable substitute thereof. Each projectile 5 may have a colored exterior, including a multi-colored exterior. For example, the exterior of projectiles 5 may be orange and black or orange and white, thereby enhancing the visibility of the projectiles 5 and rendering the projectiles 5 highly visible. Highly visible projectiles 5 advantageously decrease the likelihood of misplacing a projectile 5 and being unable to locate the misplaced projectile 5, such that the safety hazard of hidden or waylaid projectiles 5 is minimized.

The liquid reactant may be any suitable reactant that produces a delayed exothermic reaction on being brought into contact with the incendiary material within the spheres that is sufficient to produce a prescribed fire where the primed spheres land. The delay of the exothermic reaction must be long enough to allow for time for the primed projectiles to be safely launched from the apparatus 10 and preferably include some additional time for a margin of safety. The delay is typically 25 to 30 seconds. In the case where the incendiary material within the spheres is potassium permanganate, a suitable reactant is ethylene glycol or glycerin, and this combination produces a suitable exothermic reaction to cause a fire and with an appropriate delay.

Suitable projectiles for use with the disclosed systems and methods include, but are not limited to spherical projectiles, for example spherical projectiles of about 1" in diameter. Typically, the spherical projectiles comprise a polymer casing, for example plastic, nylon, polyester, polyacrylate, acrylamide, or polycarbonate enclosing incendiary material such as potassium permanganate. The casing can be impermeable to moisture to prevent reactants from reacting with the enclosed incendiary material or degradation of the incendiary material. In one embodiment, about 3 grams (about 0.1058 ounce) or less of potassium permanganate is contained in the sphere. Suitable space is left in the sphere to accommodate the reactant or catalyst. In operation, a catalyst or reactant, preferably a fluid catalyst or reactant such as ethylene glycol or glycerin is delivered to the interior of the sphere, for example by injection. After delivery, the reactant or catalyst reacts with the incendiary material ultimately resulting in combustion. The reactant or catalyst can be formulated so that combustion occurs at least about 10 seconds after being ejected from the disclosed device. The formulation can include the addition of a delay-release material so that the reactant or catalyst is slowly released and able to react with the incendiary material. Delayed-release materials are known in the art.

Vehicle Mount

Referring to FIG. 1, an embodiment of a vehicle mount such as the vehicle mount 12 is further described and illustrated, and is operable to removably attach the apparatus 10 to a vehicle. The vehicle mount 12 comprises an upper frame 26 that is connected to a lower frame 28 by vibration dampeners 30, which may be elastomeric tubular sections mounted between said frames. In the illustrated embodiment, the upper frame 26 and the lower frame 28 are each comprised of elongate metal extrusions 32 that are connected to define the rectangular shape of each frame. The metal extrusions 32 each define a longitudinal channel 34 that is partially bounded on the sides by longitudinal flanges 36 that extend inwardly towards the center of the channel 34. Accordingly, the metal extrusions 32 is adapted to slidably receive square mounting nuts (not shown) within the pt 34 that can be used to mount the metal extrusions 32, hence the frame, to vehicle-mounted brackets 38 using bolts 40. An example of the metal extrusions 32 are those distributed by the Unistrut Corporation under the trademark UNISTRUT. An advantage of using metal extrusions 32 in the construction of the lower frame 28 is that the slidable placement of the square mounting nuts within the channel 34 enables flexibility in the placement of the vehicle-mounted brackets 38 on the vehicle, which allows for one configuration of vehicle mount 12 to be used with several mounting bracket configurations, hence vehicle types. In typical practice of the illustrated apparatus 10, the lower frame 28 is connected to the vehicle mounted brackets 38 and the upper frame 26 is preferably isolated by the vibration dampeners 30 from direct shocks transmitted to the lower frame 28 by the vehicle.

Hopper Assembly

Referring to FIGS. 1-4, an embodiment of a projectile delivery assembly such as the hopper assembly 14 is further described and illustrated, and is operable to store unprimed incendiary projectiles and to deliver the unprimed projectile spheres 5 to the projectile launcher 18 in response to signals from controller 22. Advantageously, embodiments of the hopper assembly 14 also provide an apparatus for storing a plurality of spheres of a uniform size and delivering the spheres one at a time to a desired location.

The hopper assembly 14 comprises an upper cylinder 44, a lower cylinder 46, and a round divider plate 48 which separates the space within the upper cylinder 44 from the space within the lower cylinder 46.

The upper cylinder 44 acts as a storage container for the unprimed projectile spheres. It is open on its top end to allow spheres to be poured into the hopper assembly 14. The upper cylinder 44 is preferably made from a clear material so that an operator can see the level of spheres in the hopper assembly 14. A lid to close the opening of the upper cylinder 44 may be provided.

In the bottom of the upper cylinder 44 just above the divider plate is provided a rotating assembly 50 that is operable to select one unprimed projectile sphere from the spheres in the upper cylinder 44 and deliver that sphere to an outlet passage such as outlet tube 52, which is located tangentially to the lower cylinder 46. The rotating assembly 50 is driven by a hopper motor such as motor 54 located within the lower cylinder 46 via a shaft and linkage mechanism 56 that passes through a central hole 58 in the round divider plate 48, which is itself stationary.

The rotating assembly 50 comprises a deflector such as conical member 60, a disk shaped selector plate 62, and a rotor 64 that are stacked on top of each other, wherein the rotor 64 includes a disk shaped body 65 a pair of rigid vanes 66 and eleven pairs of flexible vanes 68 distributed around the circumference of the disk shaped body 65 and extending from its outer edge 70. The diameter of the round divider plate 48 and the selector plate 62 is the same or nearly the same as the inside surface of the lower cylinder 46, whereas the diameter of the conical member 60 and disk shaped body 65 is less than the diameter of the inside surface of the lower cylinder 46 by an amount slightly larger than the diameter of the projectile spheres. Accordingly the outer edge 70 of the disk shaped body 65 and the inside surface of the lower cylinder 46 define an annular space having the width slightly larger than a sphere so as be able to accommodate the spheres within the annular space. The lengths of the flexible vanes 68 are such as to nearly extend across the annular space.

The purpose of the conical member 60 is to deflect the spheres within the bottom portion of the upper cylinder 44 to run in an annular path around the perimeter of the selector plate 62, above the annular space.

The selector plate 62 is provided with a slot 72 in its periphery that is large enough to allow one sphere to drop through it to the annular space below the selector plate 62. The selector plate 62 is positioned relative to the rotor 64 so that the slot 72 aligns with the space 74 between the rigid vanes 66 and an adjacent pair of the flexible vanes 68. As the selector plate 62 rotates, the slot 72 on its periphery allows a sphere to drop into the annular space between the rotor body 65 and the inside wall of the lower cylinder 46. The rigid vanes 66 define the limits of the space 74 to prevent a second sphere from falling into the space 74. As the rotating assembly 50 continues to rotate, the sphere is carried around the annular space until it reaches the tangential outlet tube 52, where a finger 76 that extends into the annular space from the outlet tube 52 strips the sphere away and directs it into the outlet tube 52 which arranges the projectiles into a projectile queue 6.

As the rotor 64 turns, the flexible vanes 68 briefly contact and then brush past the last projectile 7 in the projectile queue 6 to impart a periodic motive force on the last projectile 7 that is transmitted to the other projectiles in the projectile queue 6, tending to move the projectiles towards an outlet 53 of the outlet tube 52 that discharges or delivers the projectiles to the projectile launcher 18. Advantageously, these periodic repeated pushes provided to the spheres in the outlet tube 52 by the flexible vanes 68 provides a relatively constant feed pressure tending to push the spheres through the outlet tube 52. This feed pressure advantageously enables the hopper assembly 14 to be tipped at an angle from vertical and yet continue to deliver the unprimed projectile spheres to the projectile launcher 18. This is an important advantage, particularly in applications of the apparatus 10 on terrestrial vehicles where the contours of the terrain impart tilting and jarring to the apparatus 10 that render hopper designs which do not produce a feed pressure considerably less usable in such applications.

The rotating assembly 50 and the outlet tube 52 provide an embodiment of a separator assembly that is connected to the container for isolating one projectile from the plurality of projectiles and delivering said projectile to the launching assembly. However, it is contemplated that the separator assembly may be provided in other embodiments.

The outlet tube 52 is provided with a bypass port 78 near the origin of the outlet tube 52 at the lower cylinder 46, and the bypass port 78 allows unprimed spheres to exit the outlet tube 52 in the event of a feed jam downstream in the outlet tube 52. Preferably, the bypass port 78 discharges into a mesh bag (not shown) where the discharged unprimed spheres are collected, thereby making it relatively easy to reintroduce the unprimed spheres into the upper cylinder 44.

The hopper motor 54 does not operate continuously. When a trigger signal is received by the controller 22, the controller 22 then causes the motor 54 to start to rotate. It continues to rotate until a small cam (not shown) on the underside of the rotor 64 trips a hopper limit switch 61 that protrudes through a slot 63 in the divider plate 48. This hopper limit switch 61 sends a signal to the controller 22 which then stops the motor 54. Accordingly, the hopper assembly 14 operates intermittently only as required to provide an unprimed sphere to the projectile launcher 18.

The hopper assembly 14 is mounted to a base plate 80 (FIG. 1) that is common with the projectile launcher 18, and the base plate 80 is rotatably connected to the vehicle mount 12. This allows the hopper assembly 14 and the projectile launcher 18 to rotate, preferably through 180° of operation, to enable an operator of the apparatus 10 to direct the launching of the primed spheres in a desired direction relative to the direction of travel of the vehicle on which the apparatus 10 is mounted. The projectile launcher 18 is also independently mounted to the base plate 80 by a pivoting clamp mechanism, comprising of a bolt member 79 that may be releasably tightened against a bracket 81 by a clamp handle 83, to allow the projectile launcher 18 to be tilted upward and downward, preferably through 40° of elevation for enhancing operator control over the trajectory of the launched spheres. The pivoting clamp mechanism is slidably mounted to the base plate 80 by a sliding clamp mechanism 89 which allows for the projectile launcher to be slid away from the hopper assembly for maintenance or jam clearing purposes.

Projectile Launcher

Referring to FIGS. 5-9, an embodiment of a pneumatic launching assembly such as the projectile launcher 18 is further described and illustrated, and is operable to inject the unprimed projectile spheres 5 with the reactant to prime them, and then launch the primed projectile spheres away from the apparatus 10 by means of the pressurized propellant gas delivered to the projectile launcher 18 by the gas system 20. The term “pneumatic” as used herein shall mean “operated by air or gas under pressure”.

The projectile launcher 18 comprises a frame 84 having a top plate 86 and a bottom plate 88 that are connected at the front by a front plate 90, and at the back by a reactant pump manifold block 92, such that the two plates are in parallel alignment with each other. The top plate 86 and the bottom plate 88 are nearly identical, and each is provided with a drive shaft hole 94, a swing arm guide channel 96 forward of the drive shaft hole 94, and a shuttle guide channel 98 rearward of the drive shaft hole 94.

Within the interior space defined by the frame 84, towards the rear, is mounted a receiver such as barrel receiving block 100, which comprises a rectangular metal body through which extends a longitudinal bore 102. A circular access port 103 is provided on the side of the barrel receiving block 100 facing toward the inside of the frame 84, hence towards the outlet tube 52. The access port communicates with the longitudinal bore 102 and is large enough to admit a projectile sphere into the longitudinal bore 102. An O-ring 106 is pressed into the rear of the bore 102 and is held in place by a cylindrical part 108 of a breach plug 110 that is mounted to the rear of the barrel receiving block 100. The cylindrical part 108 is adapted to closely fit with the slightly larger bore portion of longitudinal bore 102, and includes a chamfered leading edge 112 that forces the o-ring 106 to provide an airtight seal between the cylindrical part 108 and the longitudinal bore 102. The breach plug 110 is provided with a bore 114 that extends through the breach plug 110 and into the longitudinal bore 102, and which provides a conduit for the propellant gas from the gas system 20 into the longitudinal bore 102, as will be describe further herein.

The projectile launcher 18 includes an elongate tubular barrel 118 that receives and launches the primed projectile spheres. The rear part of the elongate tubular barrel 118 is received within the longitudinal bore 102 of the barrel receiving block 100 for slidable reciprocating movement there within. A front portion of the elongate tubular barrel 118 passes through a hole 120 in the front plate 90 which provides stability to the elongate tubular barrel 118, and a bushing 122 between the elongate tubular barrel 118 and the hole 120 provides for a smooth sliding fit between the elongate tubular barrel 118 and the front plate 90. Likewise, a bushing 124 between the front of the longitudinal bore 102 and the elongate tubular barrel 118 provides for a smooth sliding fit between the elongate tubular barrel 118 and the barrel receiving block 100. About midway along the length of the elongate tubular barrel 118 is provided a cylindrical ring member 126 fixed to the outside surface of the elongate tubular barrel 118 to which are connected vertically oriented, diametrically opposed barrel guide bushings 128 which abut and slide along the guide edges 130 on the top plate 86 and bottom plate 88. The elongate tubular barrel 118 and the ring member 126 define a forward facing annular shoulder 132, and a coil spring 134 around the elongate tubular barrel 118 and seated between the annular shoulder 132 and the front plate 90 in a partially compresses state provides a force that biases the elongate tubular barrel 118 in a rearward direction. The top plate 86 and the bottom plate 88 include stop edges 136 against which the barrel guide bushings 128 rest to define the rearward limit of the barrel's travel. At this rearward most position, the length of the rearward portion of the elongate tubular barrel 118 is such that the rear edge or breach of the barrel 118 abuts the o-ring 106 to provide an airtight seal.

Figure 6:
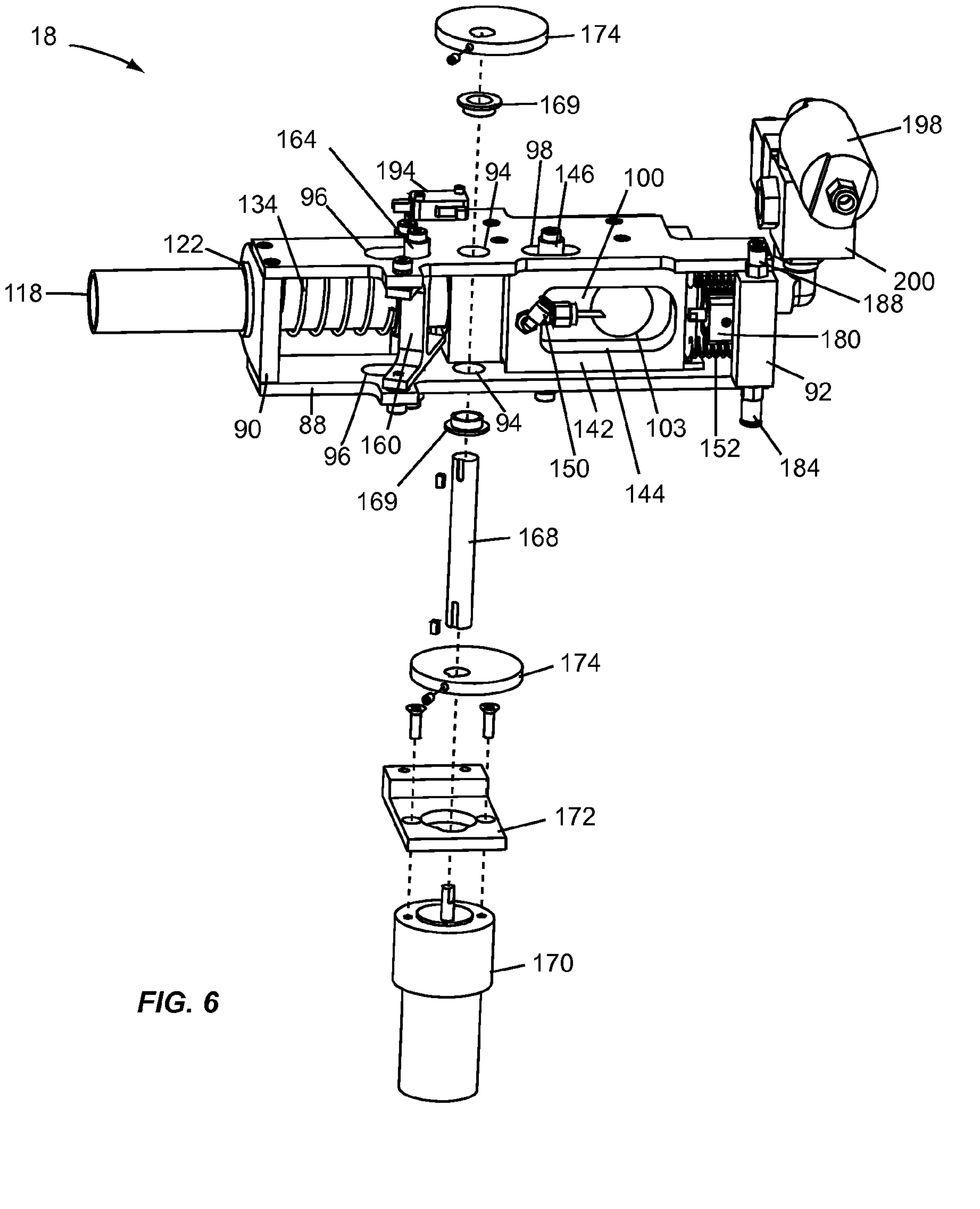
FIG. 6 is an exploded view from the left of the projectile launcher shown in FIG. 5.
Figure 8:
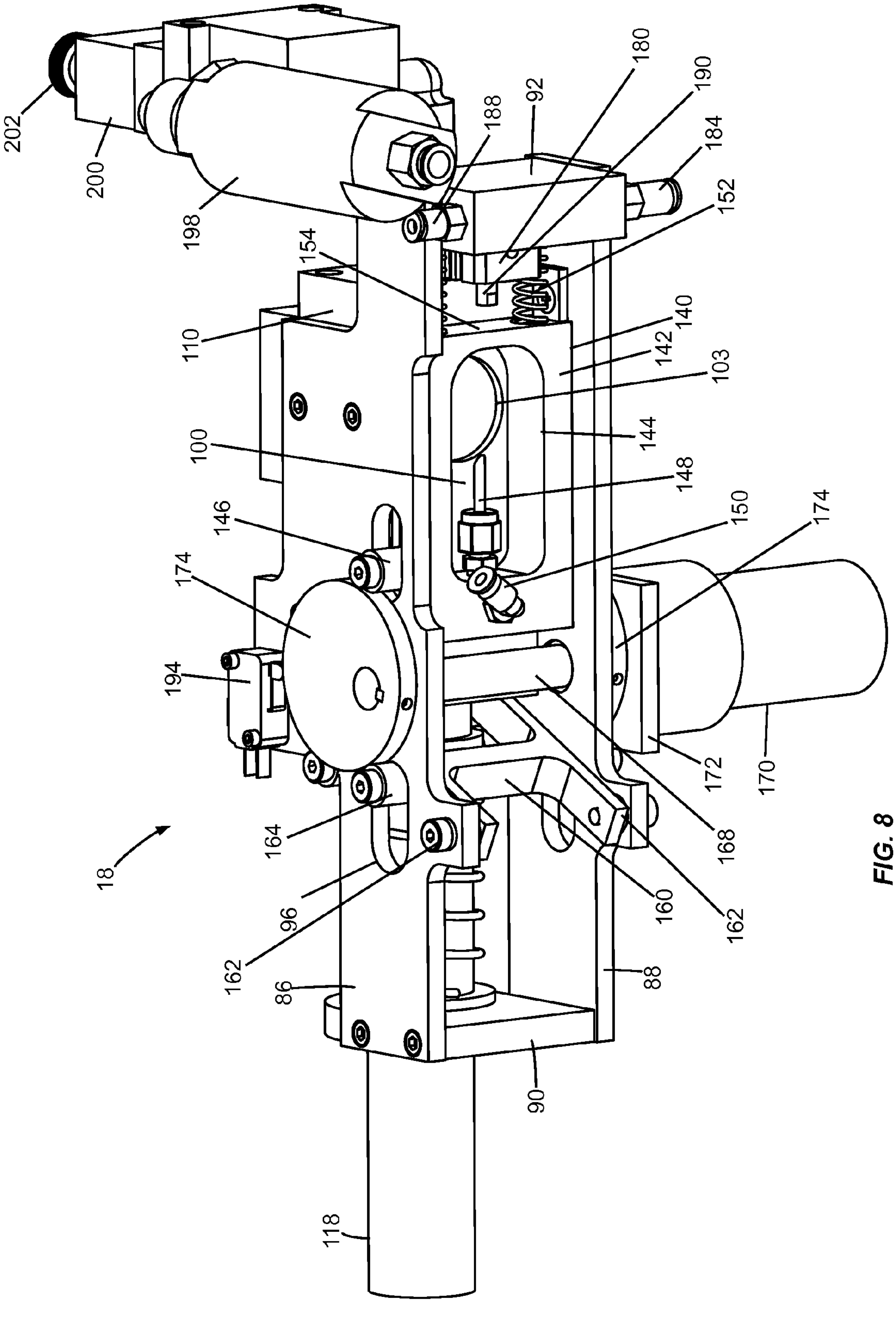
FIG. 8 is a perspective view from the left of the projectile launcher and a portion of a gas system shown in FIG. 5.
Figure 9:
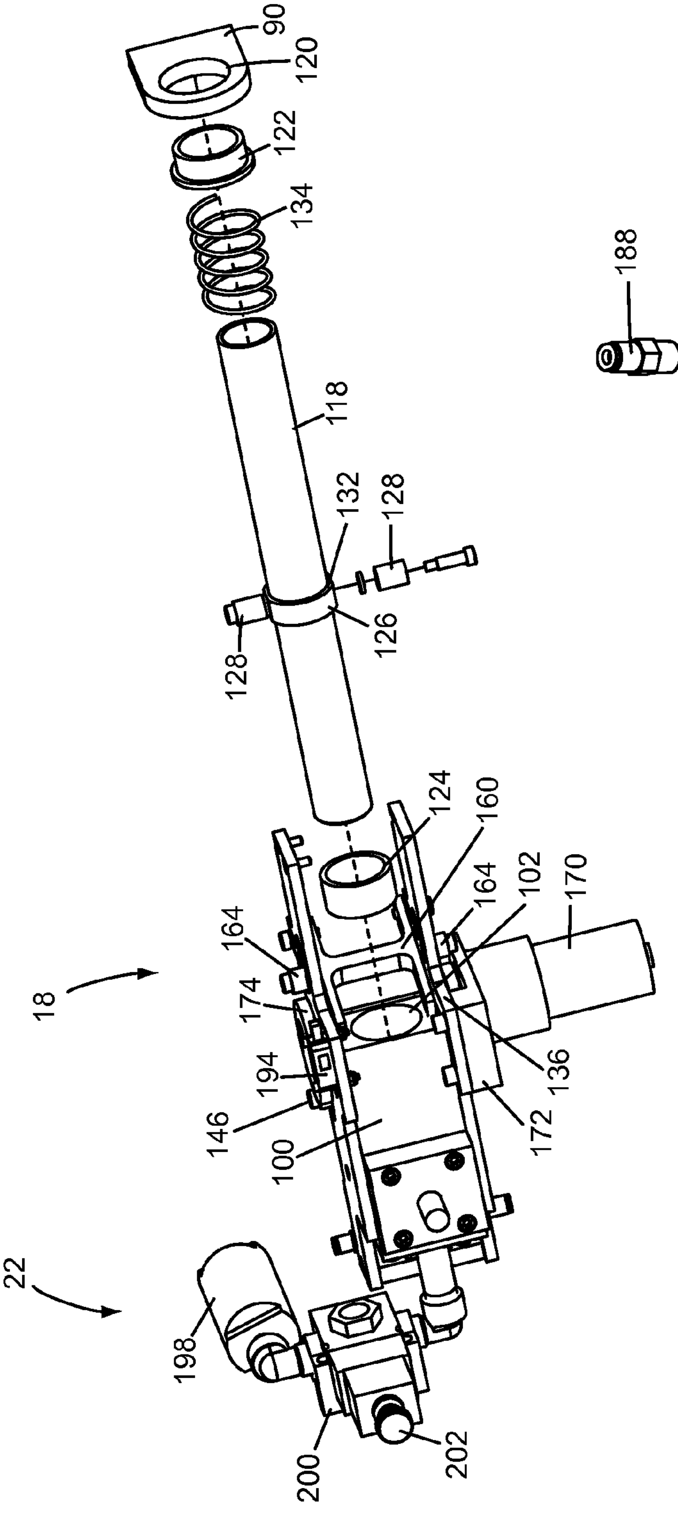
FIG. 9 is an exploded view from the right of the projectile launcher and portion of the gas system shown in FIG. 5
Figure 10:
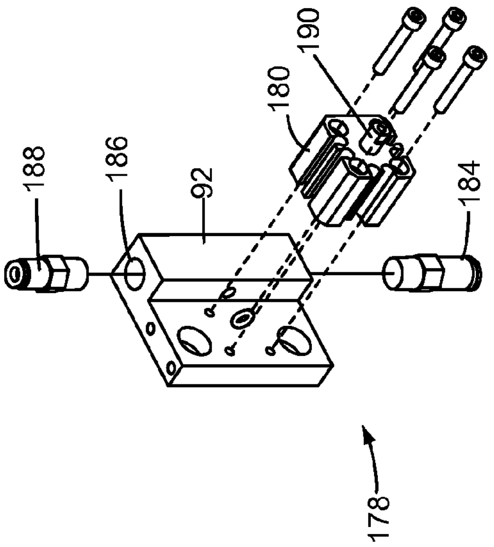
FIG. 10 is an exploded view of a reactant pump of the apparatus shown in FIG. 1.

Referring to FIGS. 6 and 8, the projectile launcher 18 further includes an injection shuttle 140 comprising a rectangular body 142 that defines a rectangular central cavity 144 passing through the thickness of the body 142. The injection shuttle 140 is mounted for sliding reciprocating forward-aft movement within the space defined by the frame 84 and against the side of the barrel receiving block 100 having the access port. The top and bottom edges of the body 142 each have a vertically oriented shuttle bushing 146 that is adapted to travel within the shuttle guide channel 98 on the respective top plate 86 and bottom plate 88. A reactant injector needle 148 is provided within the forward portion of the cavity 144 and is in fluid communication with an injector inlet coupling 150. The cavity 144 is high enough to accommodate a sphere therein and is wider than such sphere by an amount approximately equal to the length by which the injector needle 148 invades the cavity 144. The cavity 144 is aligned with the access port on the barrel receiving block 100. The shuttle 140 is biased towards a forward direction by a pair of coil springs 152 that are mounted between the rear edge 154 of the injection shuttle 140 and the manifold block 92.

Referring again to FIGS. 6, 8 and 9, the projectile launcher 18 includes an H-shaped swing arm 160 that is hingedly mounted by hinge connections 162 within the space defined by the frame 84 forward of the drive shaft hole 94. The top and bottom edges of the swing arm 160 each have a vertically oriented swing arm bushing 164 that is adapted to travel within the swing arm guide channel 96 on the respective top plate 86 and bottom plate 88 and provides the range of swinging movement of the swing arm 160. The ends of the swing arm 160 remote from the hinge connections 162 engage the barrel guide bushings 128 on the rearward side and cause the elongate tubular barrel 118 to move forward against the bias of the coil spring 134. The various cooperating parts are adapted to provide a range of motion that moves the elongate tubular barrel 118 forward a distance sufficient to uncover the access port in the barrel receiving block 100 to allow a projectile sphere to enter into the longitudinal bore 102. As can be seen from the figures, the shuttle bushing 146 and swing arm bushing 164 extend beyond the respective upper surface of top plate 86 and the lower surface of the bottom plate 88.

Referring to FIG. 6, the projectile launcher 18 further includes a drive shaft 168 received for rotation within the drive shaft hole 94 in the top plate 86 and the bottom plate 88, and connected to a drive motor such as motor 170 that is mounted to the bottom plate 88 by a motor mount 172. Bushings 169 between the drive shaft 168 and the drive shaft hole 94 provide for a smooth rotation of the drive shaft 168. A pair of circular cams 174 are fixed to the drive shaft 168, one adjacent the top surface of the top plate 86 and one adjacent the bottom surface of the bottom plate 88, in such manner that the cams 174 rotate in unison in an eccentric manner about the axis of the drive shaft 168. The cams 174 are dimensioned to engage the shuttle bushing 146 during a portion of their revolution while disengaging from the swing arm bushing 164, and to engage the swing arm bushing 164 during another portion of their revolution while disengaging from the shuttle bushing 146. As the cams 174 rotate, they cause the reciprocating movement of the injection shuttle 140 and the swinging movement of the swing arm 160.

Accordingly, the motor 170, the drive shaft 168, and the cams 174 provide an embodiment of an actuator that cooperates with the barrel to cause the barrel to reciprocate and that also cooperates with the reciprocating piercing mechanism to cause the reciprocating piercing mechanism to reciprocate to synchronize the movement of the barrel and the reciprocating piercing mechanism. However, it is contemplated that the actuator may be provided in other embodiments.

Referring to FIGS. 6, 7, 8 and 10, the projectile launcher 18 further comprises a reactant pump 178 that comprises the pump manifold block 92 to which is attached a pump cylinder block 180. The pump manifold block 92 includes a reactant inlet 182 for receiving reactant and an inlet valve 184 attached to the reactant inlet 182. The inlet valve 184 is in fluid communication via a flexible conduit, such as rubber tubing (not shown), with fluid reactant in the reactant storage container 24. The pump manifold block 92 also includes a reactant outlet 186 and an outlet valve 188 attached to the reactant outlet 186. The inlet valve 184 and the outlet valve 188 are preferably of the non-return type such that they permit reactant flow in one direction: into the reactant pump 178 via the reactant inlet 182 and out of the reactant pump 178 via the reactant outlet 186. The reactant inlet 182 and the reactant outlet 186 of the pump manifold block 92 are in fluid communication via internal fluid passageways (not shown). The pump cylinder block 180 includes a piston 190 within a cylinder in the pump cylinder block 180 that is in fluid communication with the internal fluid passageways in the pump manifold block 92 such that movement of the piston 190 causes the reactant to flow through the pump manifold block 92.

The pump cylinder block 180 is located with the space in the frame 84 to the aft of the shuttle 140 and the components are configured such that when the shuttle 140 is near the rearward extreme end of its reciprocating motion, the rear edge 154 is operable to slide the piston 190 toward the pump manifold block 92. The extent of movement of the piston 190 is determined by the stroke length of the reciprocating path of the shuttle 140 and is independent of the reciprocating speed of the shuttle 140. In this manner, the pump piston 190 slides a substantially constant distance within the pump cylinder for each injection.

The reactant outlet valve 188 is in fluid communication via a flexible conduit, such as rubber tubing (not shown), with the injector inlet coupling 150 of the injector needle 148. Thus the reactant pump 178 is operable to cause a volume of reactant to flow to the injector needle 148 when the pump piston 190 moves toward the pump manifold block 92. The volume of reactant that flows outwardly from the reactant pump 178 is determined by the extent of movement of the piston 190 toward the pump manifold block 92 and the dimensions of the pump piston 190 and the pump cylinder, and is independent of the speed of movement of the pump piston 190. The extent of movement of the pump piston 190 is determined by the dimensions of the piston 190 and the positioning of the piston 190 relative to the rear edge 154 of the shuttle 140, and is independent of the reciprocating speed of the shuttle 140. When the shuttle 140 is proximate the pump manifold block 92 (i.e. is near the rearward extreme of its range of motion), the injector needle 148 is typically piercing a projectile located within the central cavity 144 and the reactant flowing outwardly through the injector needle 148 is injected into the projectile.

The pump piston 190 is spring biased away from the pump manifold block 92 so that when the shuttle 140 releases the piston 190 as the shuttle 140 moves forward, the piston 190 is urged away from the pump manifold block 92 creating a vacuum causing reactant to be drawn into the pump manifold block 92 via the reactant inlet 182. In this manner, reactant is stored within the pump manifold block 92 between the reactant inlet valve 184 and the reactant outlet valve 188 when the pump piston 190 is displaced from the pump manifold block 92. The stored reactant is suitable for flowing outwardly from the reactant pump 178 via the injector needle 148 when the shuttle 140 returns at the next reciprocal cycle of the shuttle 140.

The reactant pump 178 is preferably of the constant displacement pump type such that a specifiable fixed amount of reactant is injected into each projectile regardless of the reciprocating speed of the shuttle 140. The constant displacement nature of the reactant pump 178 advantageously permits an optimal amount of reactant to be injected into each projectile independently of the speed at which the shuttle 140 is reciprocating.

Together, the reactant pump 178 and the shuttle 140 provide an embodiment of an injector mechanism that is in fluid communication with the reactant storage container and operable for receiving unprimed projectiles from the projectile delivery assembly, injecting the projectiles with an amount of reactant suitable to produce a delayed exothermic reaction with incendiary material in the projectile thereby priming the projectile, and thereafter conveying the primed projectile to the launching assembly. However, it is contemplated that other embodiments of the injector mechanism may be suitably provided. The shuttle 140 provides an embodiment of a piercing mechanism, and more particularly an embodiment of a reciprocating piercing mechanism that pierces the projectile as it approaches one end of its range of motion and that disengages from the projectile as it approaches the other end of its range of motion to enable the primed projectile to be conveyed to the launching assembly. However, other embodiments of the piercing mechanism or reciprocating piercing mechanism may be provided.

In operation of the projectile launcher 18, the controller 22 receives a trigger signal and causes drive motor 170 to make one revolution of the cams 174, which produces a launching sequence. During the first 90° of revolution, the cams 174 cause the injection shuttle 140 to move rearwards. As it does, the injector needle 148 penetrates the sphere within the central cavity 144, and as the shuttle 140 continues to move rearwards, the rear edge 154 of the shuttle 140 presses against the piston 190 of the reactant pump 178 causing reactant to be pumped through the injector needle 148 into the sphere to prime the sphere. During the rearward stroke, the two shuttle return springs 152 are being compressed. During the second 90° of revolution, the cams 174 allow the shuttle return springs 152 to push the shuttle 140 back to its starting (forward) position. This retracts the injector needle 148 from the sphere. Also during this time, a spring in the reactant pump 178 causes the piston 190 to extend, charging the reactant pump 178 with reactant for the next cycle. During the third 90° of revolution, the cams 174 force the reciprocating barrel 118 to extend forward, and as the barrel 118 extends, it opens the access port in the barrel receiving block 100 adjacent to where the primed sphere is located. The feed pressure provided by the flexible vanes 68 in the hopper assembly 14 forces the primed sphere through the access port and into the bore 102. During the final 90° of revolution, the cams 174 allow the barrel 118 to return to its rearward most position under the urging of the coil spring 134. At the end of the cycle, the cams 174 activate a sensor such as the limit switch 194 which sends a signal to the controller 22 that the cycle has completed, which then causing the gas system 20 to discharge propellant gas into the barrel 118 and propel the primed sphere from the barrel 118.

Gas System

Figure 7:
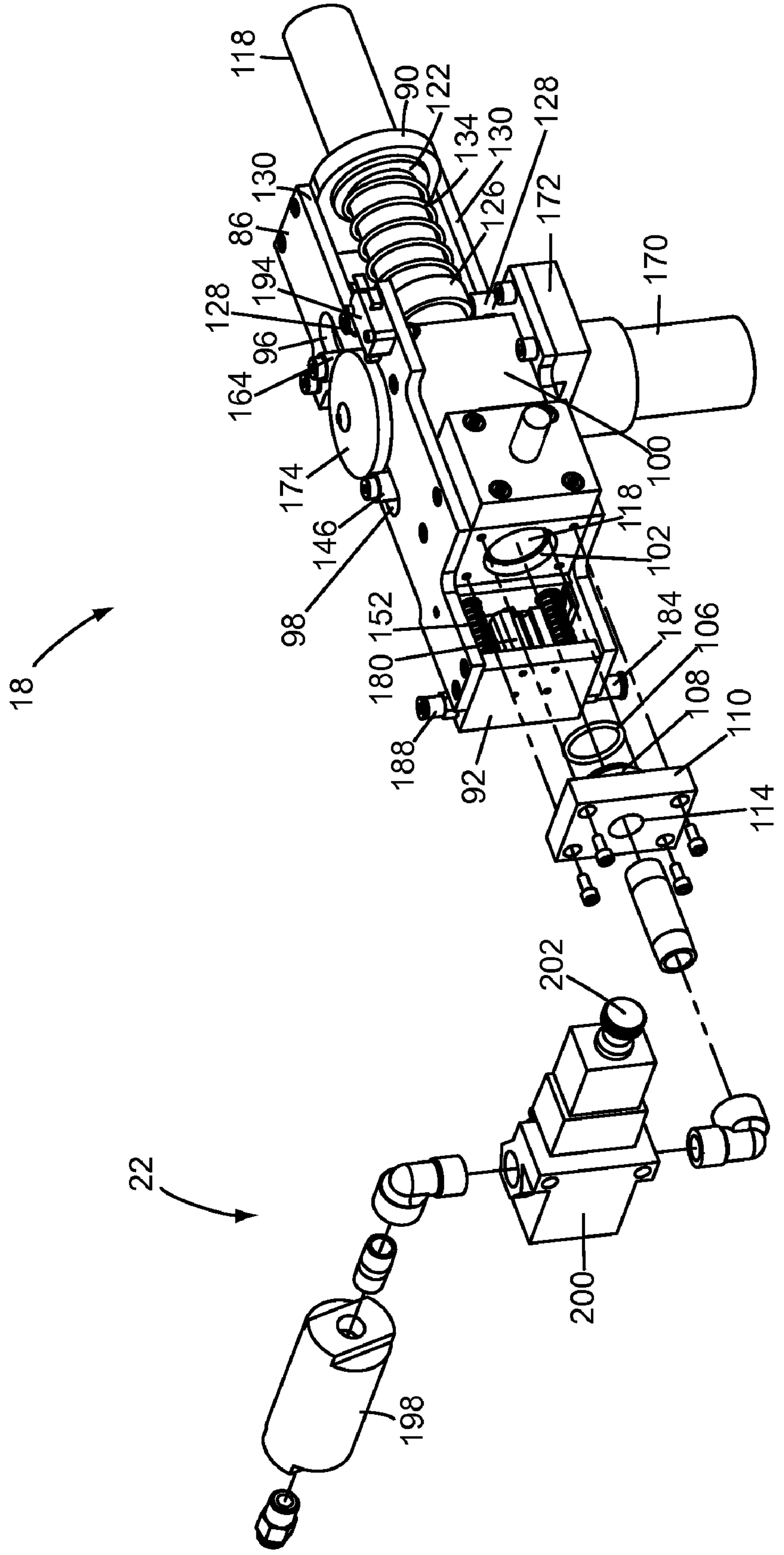
FIG. 7 is an exploded view from the right of the projectile launcher and portion of the gas system shown in FIG. 5.
Figure 11:
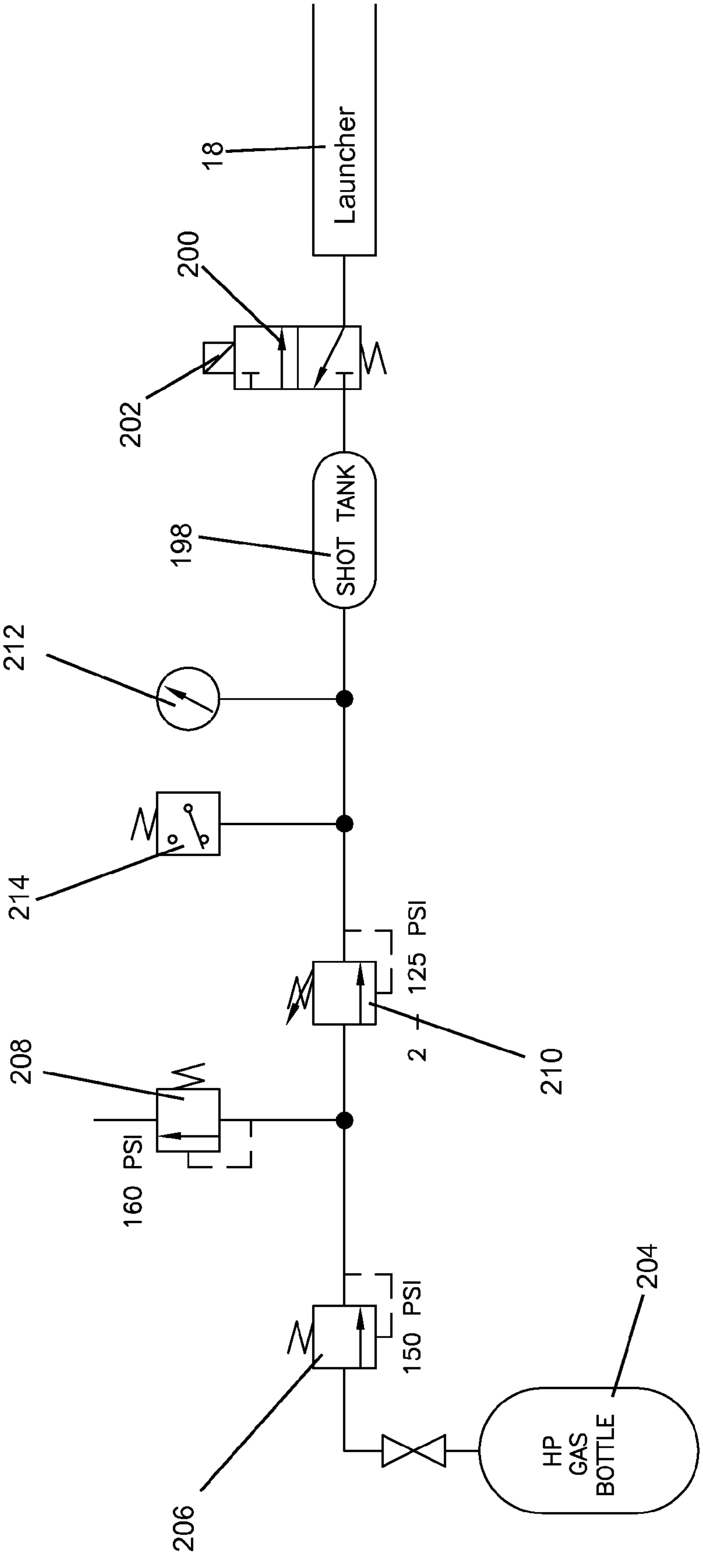
FIG. 11 is a schematic diagram of a gas system of the apparatus shown in FIG. 1.

Referring to FIGS. 7 and 11, and embodiment of a gas delivery means such as the gas system 20 is further described and illustrated and is operable to regulate and control the flow of pressurized propellant gas from a storage tank to the projectile launcher 18 in response to a signal from the controller 22 or in response to manual input from an operator of the apparatus 10.

Referring to the schematic in FIG. 11, the gas system 20 comprises a supply tank 204 containing pressurized propellant gas, a primary regulator 206, a safety relief valve 208, a secondary regulator 210, a pressure gauge 212, and a pressure switch 214. The gas system 20 further comprises a shot tank 198 and a solenoid actuated valve 200 downstream of the shot tank 198 that also includes a manual override 202.

Attached to the supply tank 204 is the primary regulator 206 that outputs a 150 PSI gas pressure to the apparatus 10 via a flexible hose and a quick disconnect fitting (not illustrated). The safety relief valve 208 prevents overpressure of the gas system should an operator mistakenly connect a gas supply that is greater than 150 PSI. The secondary regulator 208 is adjustable by the operator and its output pressure is indicated by the pressure gauge 212. By manipulating the gas pressure, an operator can control the distance that the projectile spheres are propelled by the projectile launcher 18.

The regulated gas is then directed into the shot tank 198 which is a small cylinder that acts as a gas accumulator. When the solenoid actuated valve 200 is opened by the controller 22, the volume of propellant gas in the shot tank 198 is released and directed via a conduit 204 to the bore 114, through the breach plug 110 and the into the barrel 118 to propel a primed sphere that has been loaded into the barrel 118.

The pressure switch 214 senses the gas pressure in the gas system 20 and sends a signal back to the controller 22 that is used to prevent the operation of the apparatus 10 when there is insufficient gas pressure in the gas system 20 to propel a sphere clear of the apparatus 10. This is a safety feature to prevent a primed projectile from being loaded into the barrel 118 when the gas pressure would be insufficient to propel the primed projectile out of the barrel, and preferably clear of the vehicle, thereby reducing the risk of a fire in or near the apparatus 10.

While any suitable propellant gas may be used, it is preferable that the propellant gas be an inert gas so that it can also serve as a fire extinguishing agent should a fire (i.e. emergency condition) occur in the barrel 118 as a result of a jammed primed projectile sphere. In the event of a fire in the barrel 118, an operator of the apparatus 10 would actuate an emergency switch on a control panel or the manual override 202 to allow a continuous flow of the propellant gas into the barrel 118, and thereby extinguish the fire. A preferred propellant gas is carbon dioxide since it is readily available, inexpensive, and functions as a fire extinguishing agent.

Controller

Referring to FIG. 1, an embodiment of a controller such as controller 22 is further described and illustrated and is operable to control the operation of the hopper assembly 14, the projectile launcher 18, and the gas system 20. The controller 22 includes a main panel 218 is shown. In the first embodiment, the main panel 218 includes a ready indicator 220, a RUN/STOP switch 222, and a speed selector 224. Connected to the controller 22 is a remote panel 226, which in the first embodiment is in electrical communication with the controller 22 via an electrical cable 228. Additionally or alternatively, wireless communication techniques may be used for communication between the remote panel and the controller 22. The length and electrical ratings of the electrical cable 228 may be optimally selected for use of the apparatus 10 on a variety of vehicle types, or a particular configuration of remote panel 226 and electrical cable 228 may be used for a particular vehicle type. The length of the electrical cable 228 may be about 4 feet (about 1.2 meters) for use of the apparatus 10 on an all terrain vehicle, or it may be between longer, for example, for use of the apparatus 10 on a pick up truck or boat. The remote panel 226 may be powered using the main power to the apparatus 10 or may be separately powered. The remote panel 226 in the first embodiment includes a operation mode selector 230 for selecting between a manual and an automatic operation mode of the apparatus 10, a trigger switch 232 and an emergency override 234.

The controller 22 of the apparatus 10 is illustrated and described as based on a programmable logic controller (PLC) that includes eight inputs and four outputs driven through external relays. However, the controller may be implemented in other forms of processing circuits.

When the PLC is first powered up, it goes into a startup routine which causes the rotating assembly 50 in the hopper assembly 14 to rotate through a fixed number of revolutions to fill the outlet tube 52 with a queue of unprimed projectile spheres. During the startup routine, the PLC ignores any operator input to fire the projectile launcher 18. Once the startup routine is complete and there is sufficient propellant gas pressure in the gas system 20 as sensed by the pressure switch 214, the PLC will accept launch signals from the operator actuated trigger switch 232. The PLC preferably has a manual and an automatic mode of operation as selected by the operator by mode selector 230. In the manual mode, a momentary signal of the trigger switch 232 (user generated signal) will cause both the hopper assembly 14 and projectile launcher 18 to perform one complete cycle. At the end of the cycle of the projectile launcher 18, the PLC causes the solenoid actuated valve 200 to open, releasing the volume of pressurized gas stored in the shot tank 198 into the barrel 118, and the primed sphere is launched from the barrel 118. If the operator continues to hold the trigger switch 232 down when the cycle is complete, then the PLC causes a new cycle to begin right away. Once a cycle starts, it always finishes with the ejection of the primed sphere from the barrel 118. If this were not so, then a primed sphere remaining in the barrel 118 would lead to a fire in the barrel 118.

If the mode of the PLC is set to the automatic mode, the operation is slightly different. The first trigger signal from the trigger switch 232 (first user generated signal) will start the apparatus 10 in operation and it will continue to cycle until a second trigger signal (second user generated signal) is received to cause it to stop. In the automatic mode, the operator can control the speed of the machine, hence the launching rate, by the speed selector 224. The speed of the apparatus 10, hence the launching rate, is accomplished by introducing an adjustable time delay between the end of one launch cycle and the beginning of the next launch cycle. This time delay is controlled by the input from a two bit binary encoder.

The trigger switch 232 and mode switch selector 230 are located on the tethered remote panel 226 to allow the operator to remotely operate the machine. Also located on the remote panel 226 is an emergency override button 234 for the gas system, which when pushed, causes the PLC to bypass all of the other PLC functions and to open the solenoid actuated gas valve 200. This provides a way to correct an emergency condition—i.e. a fire in the barrel 118—by flushing the barrel 118 with the inert propellant gas to extinguish the fire.

Operating States

Referring to Table 1 below and in accordance with embodiments of the invention, the controller 22 is operable to produce binary output values associated with each output of the controller 22 in accordance with operating states of the apparatus 10.

TABLE 1

State Table

| | States | | | | | |
|---|---|---|---|---|---|---|
| Outputs | Pre-Load | Ready & Delay | Load | Launch | Low Pressure | Emergency |
| Hopper Motor | 1 | 0 | 1 | 0 | 0 | 0 |
| Drive Motor | 0 | 0 | 1 | 0 | 0 | 0 |
| Gas Valve | 0 | 0 | 0 | 1 | 0 | 1 |
| Ready Indicator | 0 | 1 | 1 | 1 | 0 | 0 |

When the controller 22 sets the output value of the Hopper Motor output to a logical zero (OFF), the apparatus 10 is operable to maintain the motor 54 (FIG. 4) of the hopper 14 turned off. Conversely, when the controller 22 sets the output value of the Hopper Motor output to a logical one (ON), the apparatus 10 is operable to maintain the motor 54 of the hopper 14 powered on and rotating. Similarly, an output value of logical zero (OFF) for the Drive Motor output causes the motor 170 (FIG. 5) of the projectile launcher 18 to cease rotating and an output value of logical one (ON) for the Drive Motor causes the motor 170 to be powered on and rotating. The solenoid actuated valve 200 (FIG. 5) is closed when the output value for the Gas Valve output is a logical zero (OFF), and the solenoid actuated valve 200 is open when the Gas Valve output is a logical one (ON). The Ready Indicator output of the controller 22 causes a visible indicator such as a light-emitting diode (LED) to turn on when it has an output value of logical one (ON), and to turn off when it has an output value of logical zero (OFF).

The apparatus 10 is operable to perform operations in accordance with the operating states shown in Table 1. When the apparatus 10 is operating in the Pre-Load state, the controller 22 is operable to maintain the output value of the Hopper Motor output ON while maintaining output values of OFF for the other outputs of the controller 22. When the apparatus 10 is operating in the Ready and Delay states, however, the controller 22 is operable to maintain the output value of the Ready Indicator output ON while maintaining output values of OFF for the other outputs of the controller 22. The controller 22 maintains output values of ON for the Hopper Motor output, Drive Motor output and Ready Indicator output when the apparatus 10 is operating in the Load state. When operating in the Launch state, the controller 22 is operable to maintain output values of ON for the Gas Valve output and the Ready Indicator output. If the apparatus 10 is operating in the Low Pressure state, all outputs of the controller 22 are set to OFF. All outputs of the controller 22 are set to OFF except the Gas Valve output, which is set to ON, if the apparatus 10 is operating in the Emergency state.

Figure 12:
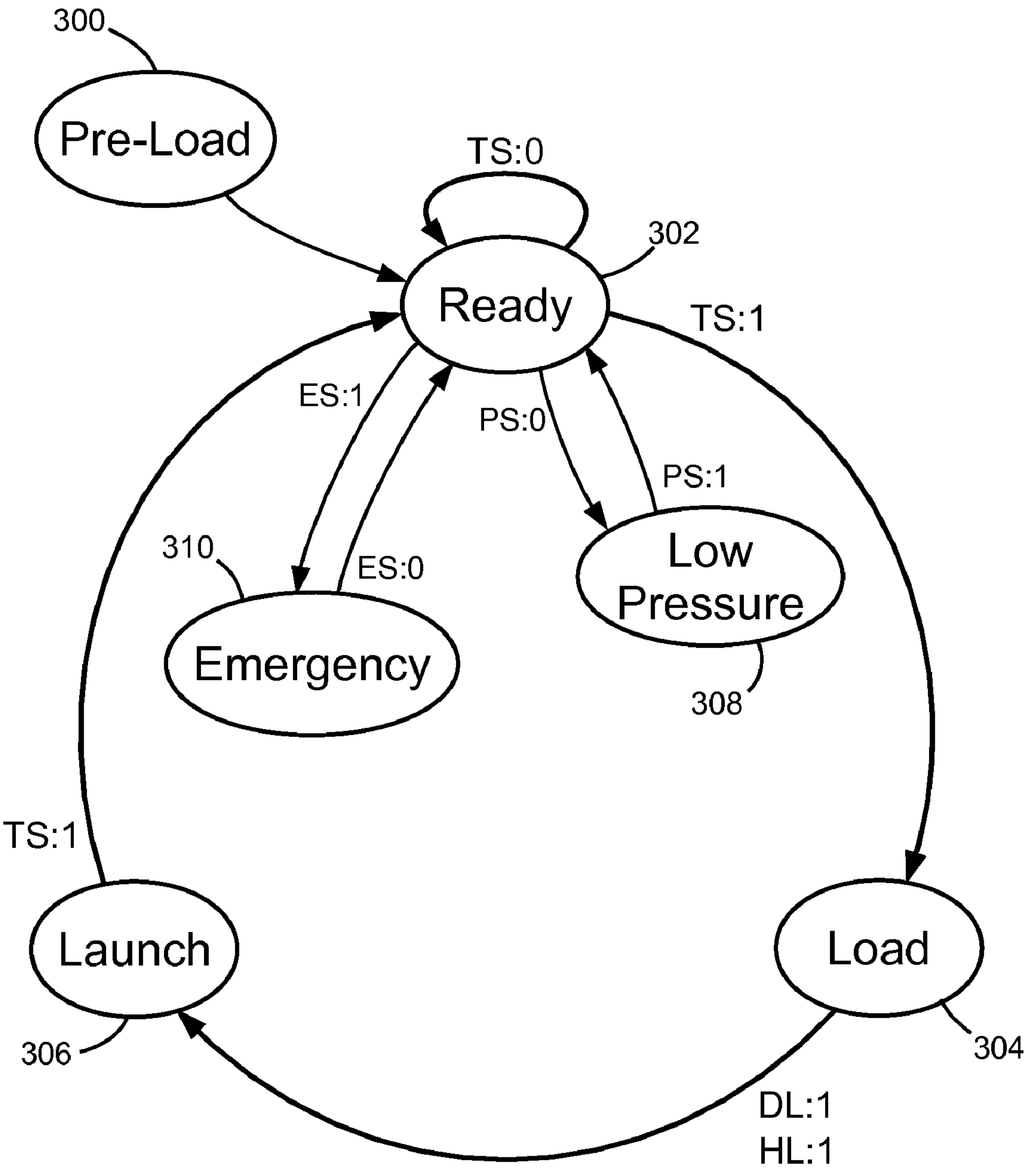
FIG. 12 is a state diagram of manual mode operating states of the apparatus shown in FIG. 1.
Figure 13:
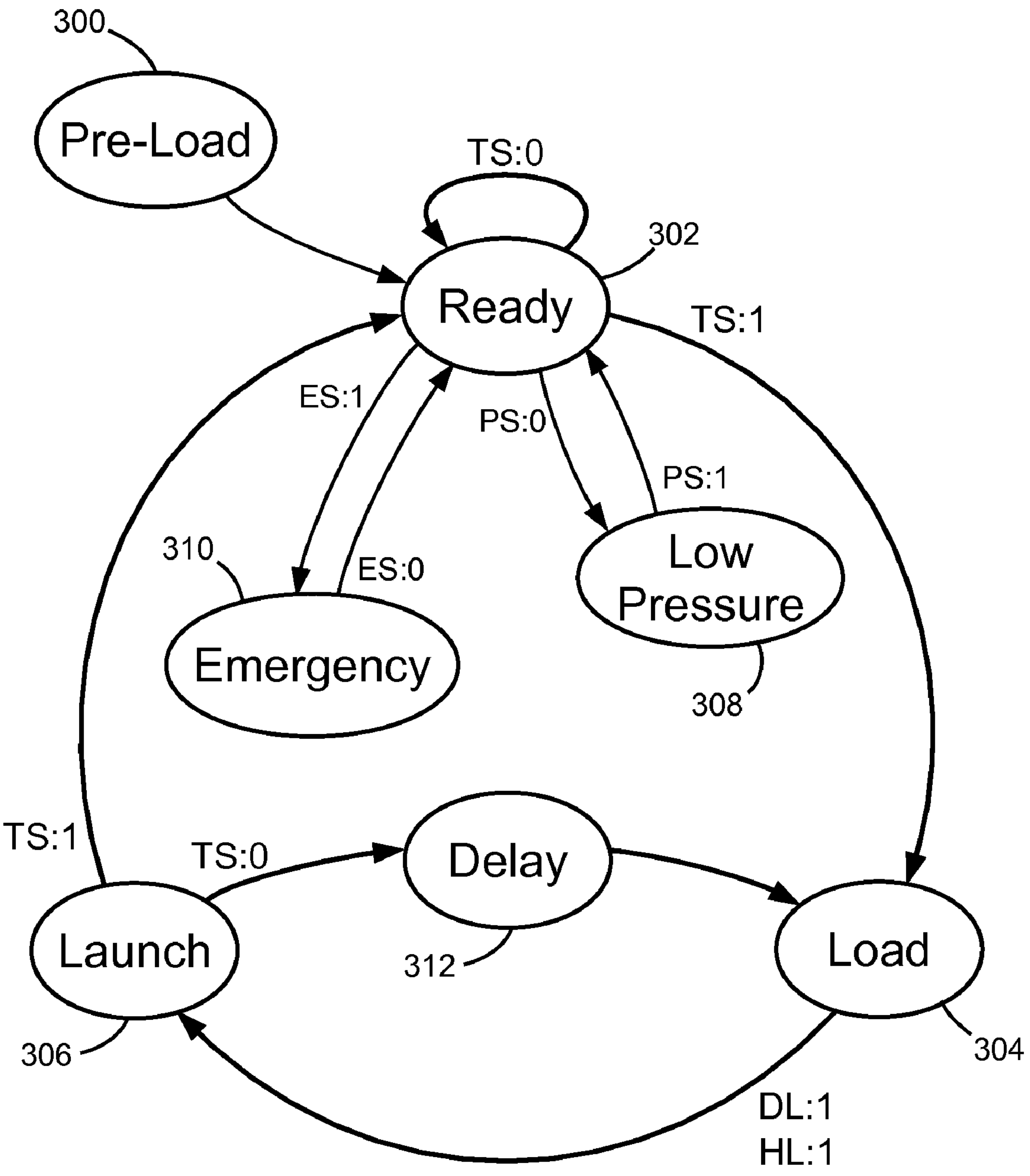
FIG. 13 is a state diagram of automatic mode operating states of the apparatus shown in FIG. 1.

Referring to FIGS. 12 and 13, the apparatus 10 is operable to transition between operating states in accordance with changes in input values of inputs received by the controller 22. In accordance with embodiments of the invention, the controller 22 is operable to receive in respect of a mode input of the controller 22 an input value of logical zero (MANUAL) when the mode selector 230 (FIG. 1) is set to manual mode. Conversely, the controller 22 is operable to receive an input value of logical one (AUTO) for the mode input when the mode selector 230 is set to automatic mode. The controller 22 is operable to receive in respect of a trigger switch input of the controller 22 an input value of logical one (TS:1) when the trigger 232 (FIG. 1) is actuated, such as by a user pressing the trigger 232. Preferably, the trigger switch input returns to an input value of (TS:0) after the controller 22 has received the input value of TS:1, which is not necessarily when the trigger 232 is released from actuation and may be before the trigger 232 is released from actuation for example. Additionally or alternatively, the controller 22 may be operable to disregard the trigger switch input after a given TS:1 input value has been received until actuation of the trigger 232 is released, thereby advantageously permitting edge triggering in respect of the trigger switch input. The controller 22 is operable to receive in respect of a hopper limit switch input an input value of logical one (HL:1) when a hopper limit switch 61 (FIG. 4) of the hopper 14 is triggered, thereby indicating that the hopper 14 has provided an unprimed projectile sphere 5 to the projectile launcher 18. The hopper limit switch may be triggered by a cam of the hopper 14, for example. Conversely, the controller 22 is operable to receive an input value of logical zero (HL:0) for the hopper limit switch input when the hopper 14 has not yet completed providing an unprimed projectile sphere 5 to the projectile launcher 18. The controller 22 is operable to receive in respect of a drive motor limit switch input an input value of logical one (DL:1) when the limit switch 194 (FIG. 6) is triggered, thereby indicating that the projectile launcher 18 has completed priming the projectile sphere 5 such that the projectile sphere 5 is available for launching. Conversely, the controller 22 is operable to receive an input value of logical zero (DL:0) for the drive motor limit switch input when the projectile launcher 18 has not yet completed priming the projectile sphere 5. The controller 22 is operable to receive in respect of a low pressure input an input value of logical zero (PS:0) when the pressure switch 214 (FIG. 11) is indicating low pressure. Preferably, the pressure switch 214 indicates low pressure when the gas system 20 (FIG. 1) contains insufficient gas pressure to suitably launch a projectile sphere 5. The controller 22 is operable to receive an input value of logical one (PS:1) for the low pressure input when the pressure switch 214 is indicating sufficient pressure. The controller 22 is operable to receive in respect of an emergency input an input value of logical one (ES:1) when the emergency override button 234 has been actuated, and an input value of logical zero (ES:0) when the emergency override button 234 is released from actuation. Other arrangements of input value definitions are possible such as a logical one indicating manual mode and a logical zero indicating automatic mode, a logical zero indicating actuation of the emergency override button 234, and other arrangements for example.

Referring to FIG. 12, the apparatus 10 is operable to perform operations in accordance with operating states 300 to 310 of the apparatus 10 when the mode selector 230 (FIG. 1) is set to manual mode. When electrical power is initially provided to the apparatus 10, the controller 22 is directed to commence operations in the Pre-Load state 300. In the Pre-Load state 300, the controller 22 is directed to set the Hopper Motor output to ON for a fixed number of revolutions of the rotating assembly 50 of the hopper 14, such as five revolutions which may be indicated by the hopper limit switch 61, for example. Typically, operation in the Pre-Load state 300 causes the outlet tube 52 to be filled with a queue of unprimed projectile spheres 5. Upon completion of the fixed number of revolutions of the rotating assembly 50, the controller 22 is directed to transition to the Ready state 302.

If the apparatus 10 is operating in the Ready state 302 and the trigger 232 has not been actuated such that the controller 22 is receiving an input value of TS:0 for the trigger switch input, then the controller 22 is directed to maintain the apparatus 10 in the Ready state 302. If the trigger 232 is actuated such that the controller 22 receives a TS:1 input value for the trigger switch input, then the controller 22 is directed to cause the state of the apparatus 10 to transition from the Ready state 302 to the Load state 304.

While operating in the Load state 304, the apparatus 10 is operable to cause the hopper 14 to load an unprimed projectile sphere 5 into the queue of the projectile launcher 18, such as by powering on the motor 54 (FIG. 4) of the hopper 14. In the Load state 304, when the controller 22 receives an input value of HL:1 for the hopper limit switch input, the controller 22 is directed to set the Hopper Motor output to OFF, thereby causing the apparatus 10 to stop the motor 54 of the hopper 14. Operating the motor 54 of the hopper 14 in the Load state 304 advantageously maintains available projectile spheres 5 in the queue for loading to the projectile launcher 18.

Also while in the Load state 304, the apparatus 10 is operable to cause the first queued projectile sphere 5 to be primed, such as by being injected with a glycol substance such that the projectile sphere 5 is available for launching. The controller 22 causes such priming function by setting the Drive Motor output to ON such that the drive motor 170 (FIG. 5) turns on. When the controller 22 receives an input value of DL:1 for the drive motor limit switch indicating that the priming function is completed and the primed sphere 5 has been loaded into the bore 102 (FIGS. 7 and 9) adjacent the cylindrical part 108 of the breach plug 110, the controller 22 is directed to set the Drive Motor output to OFF, thereby causing the apparatus 10 to stop the motor 170.

In the Load state 304, when the controller 22 has received an input value of HL:1 for the hopper limit switch input and also received an input value of DL:1 for the drive motor limit switch, the controller 22 is directed to cause the apparatus 10 to transition from the Load state 304 to the Launch state 306.

While in the Launch state 306, the apparatus 10 is operable to cause the loaded and primed projectile sphere 5 to be launched from the projectile launcher 18, such as by opening the solenoid actuated valve 200 (FIG. 5) so that pressurized gas is released, thereby causing the loaded and primed projectile sphere 5 to be propelled from the apparatus 10. The controller 22 is operable to transition from the Launch state 306 to the Ready state 302 after the solenoid actuated valve 200 has been opened for a sufficient length of time for propelling the loaded and primed sphere 5 from the apparatus 10. In at least some embodiments, the apparatus 10 is operable to close the solenoid actuated valve 200 after an elapse of time sufficient for propelling the loaded and primed projectile sphere 5, including possibly before transitioning from the Launch state 306 to the Ready state 302.

While operating in any of the Ready state 302, Load state 304, or Launch state 306, if the controller 22 receives the input value of PS:0 for the low pressure input then the controller 22 is directed to cause the apparatus 10 to transition, after its next arrival at the Ready state 302, from the Ready state 302 to the Low Pressure state 308. Additionally or alternatively, the controller 22 in at least some embodiments is operable to cause the apparatus 10 to transition from the Launch state 306 to the Low Pressure state 308, thereby bypassing the Ready state 302, if the controller 22 receives the input value of PS:0 for the low pressure input during the Load state 304 or the Launch state 306. While operating in the Low Pressure state 308, the apparatus 10 is operable to turn OFF all outputs, including maintaining the solenoid actuated valve 200 in a closed position. When operating in the Low Pressure state 308, if the controller 22 receives the input value of PS:1 for the low pressure input then the controller 22 is directed to cause the apparatus 10 to transition from the Low Pressure state 308 to the Ready state 302, thereby permitting normal operation to begin or resume.

While operating in any of the states of the apparatus 10, if the controller 22 receives the input value of ES:1 for the emergency input, such as when the emergency override button 234 has been actuated, the controller 22 is directed to cause the apparatus 10 to transition, after its next arrival at the Ready state 302, from the Ready state 302 to the Emergency state 310. Additionally or alternatively, the controller 22 in at least some embodiments is operable to cause the apparatus 10 to transition from the Launch state 306 to the Emergency state 310, thereby bypassing the Ready state 302, if the controller 22 receives the input value of ES:1 for the emergency input during the Load state 304 or the Launch state 306. In some embodiments, the controller 22 is operable to cause the apparatus 10 to cease pre-loading in accordance with the Pre-Load state 300 and to effect a transition to the Emergency state 310 immediately upon the controller 22 receiving the ES:1 input value for the emergency input, for example. While operating in the Emergency state 310, the controller 22 is directed to turn OFF all outputs except for the Gas Valve output, which is set to ON. Setting the Gas Valve output to ON advantageously causes the solenoid actuated valve 200 to open, thereby releasing any available pressurized gas. The pressurized gas is preferably a fire extinguishment gas such as carbon dioxide. While operating in the Emergency state 310, if the controller 22 receives the input value of ES:0 for the emergency input, such as when the emergency override button 234 is released from actuation, the controller 22 is directed to cause the apparatus 10 to transition from the Emergency state 310 to the Ready state 302, thereby advantageously permitting the apparatus 10 to begin or resume normal operation.

Referring to FIG. 13, the apparatus 10 is operable to perform operations in accordance with operating states 300 to 312 of the apparatus 10 when the mode selector 230 (FIG. 1) is set to automatic mode. Preferably, the apparatus 10 is operable to perform operations in the Pre-Load state 300 shown in FIG. 13 in a manner analogous, similar or identical to that described herein above in respect of apparatus 10 operation in the manual mode (FIG. 12).

In the automatic mode, if the apparatus 10 is operating in the Ready state 302 and the trigger 232 has not been actuated such that the controller 22 is receiving an input value of TS:0 for the trigger switch input, then the controller 22 is directed to maintain the apparatus 10 in the Ready state 302. If the trigger 232 is actuated such that the controller 22 receives a TS:1 input value for the trigger switch input, then the controller 22 is directed to cause the state of the apparatus 10 to transition from the Ready state 302 to the Load state 304.

After transitioning from the Ready state 302 to the Load state 304 in the automatic mode, the operation of the apparatus 10 with respect to the Load state 304 may be similar, analogous or identical to that of the operation of the apparatus 10 when in the manual mode (FIG. 12) as described herein above.

After a projectile sphere 5 has been propelled from the apparatus 10 in accordance with operation of the apparatus 10 in the Launch state 306, the controller 22 is operable to cause the apparatus 10 to transition from the Launch state 306 to the Delay state 312 if the controller 22 has not received a TS:1 input value for the trigger switch input subsequent to that TS:1 input value associated with the previous transition from the Ready state 302 to the Load state 304. While operating in the Delay state 312, the controller 22 is operable to cause the apparatus 10 to wait a specifiable delay before transitioning to the Load state 304, thereby effecting automatic continuously repeating operation of the operating states 304, 306 and 312. In at least some embodiments, the controller 22 is operable to receive binary values for a Speed Encoder High input and a Speed Encoder Low input such that the controller 22 is operable to select one of four specifiable delay times associated with the Delay state 312.

During continuously repeating operation of the apparatus 10, actuation of the trigger switch 232 is received by the controller 22 as a subsequent TS:1 input value for the trigger switch input. Upon receiving such subsequent TS:1 input value, the controller 22 is directed to cause the apparatus 10 to transition to the Ready state 302 after the next completion of the operation of the Launch state 306, as shown in FIG. 13. While in the Ready state 302, the controller 22 will cause the apparatus 10 to remain in the Ready state 302 until a further TS:1 input value of the trigger switch input is received by the controller 22.

While operating in the Delay state 312, the controller 22 is operable to receive a PS:0 input value for the low pressure input, thereby causing the apparatus 10 to transition to the Low Pressure state 308 in a manner similar, analogous or identical to that in the manual mode as described herein above, and is operable to receive a ES:1 value input for the emergency input, thereby causing the apparatus 10 to transition to the Emergency state 310 in a manner similar, analogous or identical to that in the manual mode as described herein above.

It is understood that the embodiments described and illustrated herein are merely illustrative of embodiments of the present invention. Other embodiments that would occur to those skilled in the art are contemplated within the scope of the present invention. Thus, the embodiments described and illustrated herein should not be considered to limit the invention as construed in accordance with the accompanying claims.

The invention claimed is:

1. An apparatus for launching incendiary projectiles from a moving vehicle, the apparatus comprising:

a vehicle mount for removably mounting the apparatus to the vehicle;

a pneumatic launching assembly connected to the vehicle mount and operable to launch the projectiles using a volume of gas;

a gas delivery system in fluid communication with the launching assembly for delivering the volume of gas to the launching assembly;

a projectile delivery assembly connected to the launching assembly for delivering projectiles to the launching assembly;

a reactant storage container;

an injector mechanism in fluid communication with the reactant storage container and operable for receiving unprimed projectiles from the projectile delivery assembly, injecting the projectiles with an amount of reactant suitable to produce a delayed exothermic reaction with incendiary material in the projectile thereby priming the projectile, and thereafter conveying the primed projectile to the launching assembly; and a controller for controlling the launching assembly, the gas delivery system and the projectile delivery assembly to control the launching of the projectiles.

2. The apparatus of claim 1 wherein the projectile delivery assembly delivers projectiles to the launching assembly at a launching rate and the injector mechanism injects the projectiles at the launching rate.

3. The apparatus of claim 2 wherein the injector mechanism comprises:

a pump for pumping the amount of reactant; and a piercing mechanism in fluid communication with the pump for piercing a projectile and delivering said reactant to the interior of the projectile.

4. The apparatus of claim 3 wherein the piercing mechanism is a reciprocating piercing mechanism that pierces the projectile as it approaches one end of its range of motion and that disengages from the projectile as it approaches the other end of its range of motion to enable the primed projectile to be conveyed to the launching assembly.

5. The apparatus of claim 4 wherein the pump is a constant displacement pump that delivers a fixed amount of reactant.

6. The apparatus of claim 5 wherein the reciprocating piercing mechanism is operable to actuate the pump to pump the amount of reactant as it pierces the projectile and to disengage from the pump as it disengages from the projectile thereby synchronizing the pumping of the amount of reactant with the piercing of the projectile.

7. An apparatus for launching incendiary projectiles from a moving vehicle, the apparatus comprising:

a vehicle mount for removably mounting the apparatus to the vehicle;

a pneumatic launching assembly connected to the vehicle mount and operable to launch the projectiles using a volume of gas;

a gas delivery system in fluid communication with the launching assembly for delivering the volume of gas to the launching assembly;

a projectile delivery assembly connected to the launching assembly for delivering projectiles to the launching assembly, wherein the projectile delivery assembly comprises a container for storing a plurality of projectiles and a separator assembly connected to the container for isolating one projectile from the plurality of projectiles and delivering said projectile to the launching assembly;

a controller for controlling the launching assembly, the gas delivery system and the projectile delivery assembly to control the launching of the projectiles;

wherein the separator assembly includes an outlet passage in communication with the container and the launching assembly for receiving projectiles and arranging the received projectiles in a projectile queue, and a rotating assembly mounted for rotation within the container comprising a rotor having a periphery, and a rigid vane extending from the periphery of the rotor for moving one projectile from the container and delivering said projectile to the outlet passage; and wherein the rotor further includes a plurality of flexible vanes extending from the periphery and each of the flexible vanes is adapted to briefly contact and then brush past a last projectile in the projectile queue as the rotor rotates to impart a periodic motive force on said last projectile that is transmitted to the other projectiles in the projectile queue tending to move the projectiles towards the launching assembly, thereby providing a feed pressure on the queue of projectiles.

8. The apparatus of claim 7 wherein the rotating assembly further includes a selector plate above the rotor that separates the plurality of projectiles from the rotor and defines an annular space with the rotor in which the vanes travel as the rotating assembly rotates, the selector plate further defines an opening operable to transmit one projectile at a time through the selector plate to the annular space to be engaged by the rigid vane and delivered to the outlet passage.

9. The apparatus of claim 8 wherein the outlet passage communicates tangentially with the annular space.

10. The apparatus of claim 9 wherein the outlet passage includes a finger extending into the annular space adapted for directing the projectile from the annular space into the outlet passage.

11. The apparatus of claim 10 wherein the projectile delivery assembly further comprises a deflector that directs projectiles in the container toward the opening in the selector plate.

12. An apparatus for launching incendiary projectiles from a moving vehicle, the apparatus comprising:

a vehicle mount for removably mounting the apparatus to the vehicle;

a pneumatic launching assembly connected to the vehicle mount and operable to launch the projectiles using a volume of gas;

a gas delivery system in fluid communication with the launching assembly for delivering the volume of gas to the launching assembly;

a projectile delivery assembly connected to the launching assembly for delivering projectiles to the launching assembly;

a controller for controlling the launching assembly, the gas delivery system and the projectile delivery assembly to control the launching of the projectiles;

wherein the launching assembly comprises a tubular barrel defining a breach and wherein the barrel is adapted to receiving the primed projectile and the volume of gas upstream of the primed projectile via the breach; and wherein the launching assembly further comprises a frame and wherein the barrel is mounted for reciprocating movement within the frame in a manner that at one end of the barrel's range of motion the breach is sealed to the gas delivery system and at the other end of the barrel's range of motion the breach is exposed to permit a projectile to enter the barrel.

13. The apparatus of claim 12 wherein the launching assembly further comprises an actuator that cooperates with the barrel to cause the barrel to reciprocate.

14. The apparatus of claim 13 further comprising a reactant storage container and an injector mechanism in fluid communication with the reactant storage container and operable for receiving unprimed projectiles from the projectile delivery assembly, injecting the projectiles with an amount of reactant suitable to produce a delayed exothermic reaction with incendiary material in the projectile thereby priming the projectile, and thereafter conveying the primed projectile to the launching assembly.

15. The apparatus of claim 14 wherein the actuator also cooperates with the injector mechanism to cause it to synchronize with the movement of the barrel.

16. The apparatus of claim 15 wherein the actuator produces a launching sequence wherein the launching sequence comprises:

a) causing the injector mechanism to inject a projectile with reactant;
b) causing the injector mechanism to withdraw from the projectile;
c) causing the barrel to move so as to clear the breach to enable the loading of a projectile into the barrel; and
d) causing the barrel to move to close the breach and seal with the gas delivery system.

17. The apparatus of claim 16 further including a sensor that determines the end of a launch sequence and signals the controller means to cause the gas delivery system to deliver a volume of gas to the barrel.

* * * * *